United States Patent
Khoury

(10) Patent No.: US 7,068,583 B2
(45) Date of Patent: Jun. 27, 2006

(54) NANO-SCALE RESOLUTION OPTICAL PICKUP FOR READING/WRITING ULTRA-HIGH DENSITY DATA ON CD AND DVD DATA STORAGE ELEMENTS

(76) Inventor: Jehad Khoury, 33 Tan Bark Rd., Sudbury, MA (US) 01776

( * ) Notice: Subject to any disclaimer, the term of this patent is extended or adjusted under 35 U.S.C. 154(b) by 352 days.

(21) Appl. No.: 10/373,909

(22) Filed: Feb. 26, 2003

(65) Prior Publication Data
US 2003/0147657 A1   Aug. 7, 2003

Related U.S. Application Data

(62) Division of application No. 09/642,204, filed on Aug. 19, 2000, now Pat. No. 6,577,417.

(51) Int. Cl.
*G11B 7/00* (2006.01)

(52) U.S. Cl. .............................. 369/112.1; 369/112.02; 369/95

(58) Field of Classification Search ............. 369/112.1, 369/112.02, 95, 44.12
See application file for complete search history.

(56) References Cited

U.S. PATENT DOCUMENTS

| | | | | | |
|---|---|---|---|---|---|
| 5,422,873 | A | * | 6/1995 | Kewitsch et al. | 369/103 |
| 5,532,998 | A | * | 7/1996 | Durham | 369/116 |
| 5,835,458 | A | * | 11/1998 | Bischel et al. | 369/44.12 |
| 6,363,046 | B1 | * | 3/2002 | Yoo et al. | 369/112.23 |
| 6,577,417 | B1 | * | 6/2003 | Khoury | 398/82 |

* cited by examiner

*Primary Examiner*—Hoa T. Nguyen
*Assistant Examiner*—Van T. Pham
(74) *Attorney, Agent, or Firm*—Robert Nathans

(57) ABSTRACT

A single high resolution holographic pickup, for reading/writing both a CD and DVD optical recording medium, has an electrical tuning control for applying a DC and AC signal to a tunable Bragg cell, which AC is phase locked with respect to the fundamental repetition frequency of the recorded data on the CD to produce accurate tracking. A special high resolution holographic lens is recorded within the Bragg cell that focuses the light signals read off of the optical storage mediums upon a pickup detector, and its focal length is varied to read a selected CD and or DVD from a group of CDs or DVDs in response to changes in the DC applied to the Bragg cell. The holographic lens within the Bragg cell is formed by an interference pattern produced by interfering light emitted from the tip of a one micron optical fiber and a plane broad light beam.

13 Claims, 12 Drawing Sheets

Optical Microscope Pick-ups

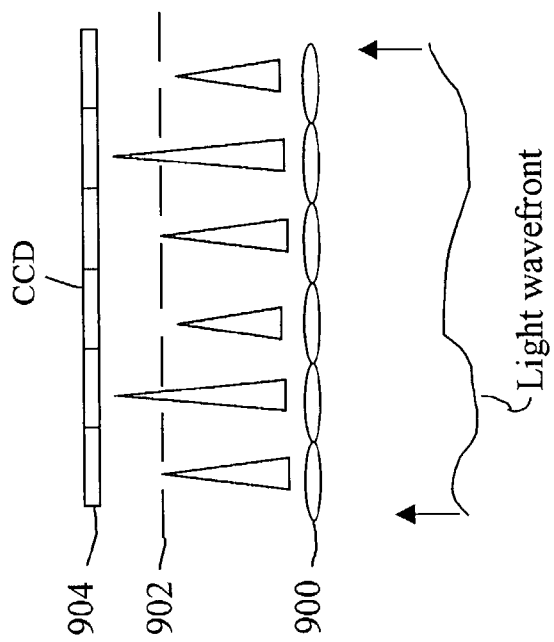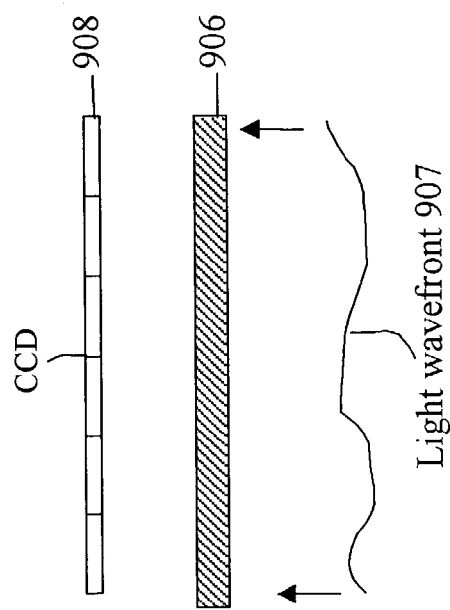

NANO-SCALE RESOLUTION OPTICAL PICKUP FOR READING/WRITING ULTRA-HIGH DENSITY DATA ON CD AND DVD DATA STORAGE ELEMENTS

RELATED APPLICATIONS

This is a divisional of patent application Ser. No. 09/642,204 filed Aug. 19, 2000, now U.S. Pat. No. 6,577,417 issued Jun. 10, 2003. The application is incorporated by reference herein.

BACKGROUND OF THE INVENTION

The present invention relates to the field of optical data processing.

Homodyne and heterodyne detection is one of the most important concepts in information processing theory. Several other concepts are associated with it, such as phase-sensitive detection, lock-in detection, frequency and time-division demultiplexing and base-band demodulation, time-integrative correlation, and many other devices, which can be fined the literature; see A. B. Carlson), *communication system: An introduction to signal and noise in electrical communication, 2 Edition* (MaGraw-Hill, New York 1975) These concepts have been used extensively in designing many electronic devices. For example the lock-in amplifier is used routinely in many microscopic and tomographic systems, see "Kyuman Cho, David L. Mazzoni and Cristopher C. Davis "Measuring of the local slope of the surface by vibrating sample heterodyne interferometery: new method in scanning microscopy, Kyuman Cho, David L. Mazzoni and Cristopher C. Davis) (for as a data acquisition tool, further they are often used in pulling the signal which is embedded in very high noise environment (reference in noise reduction within signals) (M. L. Mead, Lock in amplifier: Principles and applications, (Peregrinus, London 1983). Lock-in detection is also used in controlling machine vibrations, and components within servo systems for tracking CD, DVD and magneto-optics disk; references problems of tracking: Casimer Maurice DeCusatis, Lawrence Jacobowitz, "Active Tracking system for optical disk storage," U.S. Pat. No. 5,793,718. See also Hubert Song et al. Non-contact servotrack writing with phase sensitive detection," U.S. Pat. No. 5,991,112. Time integrative correlators are used in pattern recognition devices; e.g. applications involved in identifying a specific optical bit pattern for header recognition or code-division demultiplexing, or data base search in high speed optical communication systems or soft ware applications. See Jun Shan (Optical bit pattern recognition by use dynamic grating in erbium doped fiber) Optics letters, Volume 22, 1757–1759 (1997) Frequency and time-division, base band demodulators are also some of the most important components used for constructing telecommunications systems, networking, cable TVs. See A. B. Carlson, communication systems: An introduction to signal and noise in Electrical communication, 2 Edition (MaCraw-Hill, New York 1975).

In the recent years much attention has been devoted to the use of wavelength division demultiplexer as one of the main components for telecommunication systems base on fiber optics. See for example Optical Networking Volume 1 January 2000). See also the following U.S. patents: Optical Add-Drop multiplexer compatible with very dense WDM optical communication systems. U.S. Pat. No. 5,982,518 Nov. 9, 1999; Li "Wavelength and Bandwidth tuneable optical system," U.S. Pat. No. 5,841,918. This patent discloses a tunable Bragg cell; see also Daniel J. Fritz, Timothy J. Bailey and Mass Gary, "All Fibre wavelength selective optical switch," U.S. Pat. No. 5,446,809

Wavelength division demultiplexing not only important for telecommunication but it has significant applications in other areas including biomedical applications, remote sensing, multispectra and hyperspectra pattern recognition and fiber sensors. Wavelength division demultiplexers can employ a Fabry-Perort interferometer, including MEMS structures, Bragg Grating either in fiber, volume holographic materials, or fabricated structure for layers of Electro-optic materials, and a Mach_Zender interferometer. See the following material in Optical Society of America: Handbook of Optics, volume I and II. For enhancing the capability of transferring the data in telecommunication systems, most recently it was proposed to combine either wavelength division multiplexing (WDM), with either time (TDM) or frequency multiplexing (FDM). In the receiving end it was proposed that the wavelength demulteplexing is done optically and time or the frequency division demultiplexing is done electronically.

I believe that up until now, no one optical device is present in the prior art which can do both of these operations simultaneously. I introduce a new device concept herein that can be utilized for combining both WDM and FDM or TDM demulteplexing on the same device. I name the new device HTWDM (heterodyne time wavelength division demultiplexing), because the new device not only combines WDM with FDM or TDM, but it can combine other homodyne detection functionality with wavelength division demulteplexing functionality. In more general terms my invention can combines K-vector demultiplexing with heterodyne detection (k vector division demultiplexing will be illustrated further through the text of this invention). This combined functionality has enormous significance for many applications.

I introduce herein a general concept for homodyne and heterodyne detection based on K-vector tunable optical cells. An important application is use of the optical cells as wavelength-division demultiplexers (or in more general terms K vector division demultiplexers and mixing for homodyne heterodyne detection or time division demultiplexing will be performed in accordance with the present preferred inventive emdodiments on a single optical component. This component can operate as a low pass filter if the modulation is very fast. This is in contrast with the distributed Bragg reflector laser structure of U.S. Pat. No. 5,020,153 of Choa et al. whose invention is limited to WDM (not K-vector demultiplixing) and heterodyne detection, without any consideration for time division demultiplixing. Further in the Choa patent, each of the operations of WDM and heterodyne detection were performed in separate components within the integrated device. The Chao grating was used for WDM, whereas the heterodyne signal detection was produced by mixing the signal being detected with an external beat signal. In contrast with Chao, who discloses using distributed bragg grating within his device, the K vector selector can take numerous forms as will be illustrated. Thus the present invention can have numerous application in variety of areas ranges from telecommunication, tracking in CD and DVD, fluorescent microscopy; see M. Schrader and S, W. well, S. W. Hell, H. T. M. Van der Voort, "Three-dimensional super-resolution with 4-PI-confocal microscopes using image restoration," Journal of applied physics, 84, 4033–4041 (1998) or in Foliage averaging; see Part 1: Foliage Attention and Back scatters Analysis of SAR images, J. G. Fleischman, S. Ayasli, E. M. Adams, D. R.

Gosselin. IEEE transaction on aerospace and electronic systems, Vol. 32, No 1 January 1996 P 135–144; or for applications in Lidar (light wave radar); see J. G. Fleischman, S. Ayasli, E. M. Adams, D. R. Gosselin Part III: Multi channel Whitened of SAR imagery IEEE transaction on aerospace and electronic systems, Vol. 32, No 1 January 1996 P 156–164). In this invention also I propose a gratings to be tunable over wide range, these grating can be integrated within the structure of distributed feed back laser or vertical cavity lasers for enhancing the range of tunabiliy. It can also serve as part of add/drop demultiplexer. Other uses of the present invention include microscopic and tomographic systems, multispectra and hyperspectra pattern recognition, non-destructive testing instruments, atmospheric turbulence correction devices, remote sensing systems and velocity measuring devices.

The significance of the present invention in connection with various applications can be understood as follows: (1) In Telecommunication for increasing the channel capacity of LAN (Local area net work and WAN (wild area net work), TV Cables, Telemetry systems. (2) In all forms of homodyne and heterodyne microscopy and tomography imaging for enhancing sensitivity, which can be achieved by averaging the measurement at various wavelengths. (3) In nondestructive testing, for controlling the operation of several machines, in which each wavelength is utilized to probe the operation of one machine. (4) In high precision Lidar probing and velocimetry which may be achieved via averaging the homodyne measurement over several wavelengths (5). Data fusion for multispectra and heyperspectra pattern recognition (6). Fluorescent microscopy and tomography (7) In the last three (4,5,6) by performing spectroscopic correlation as what have been explained in my previous patent on medical diagnostics (7). In atmospheric turbulence correction providing diversity in measuring the atmospheric aberration at different wavelengths and for CD and DVD applications for the purpose of Pick-up and tracking and switching on different drive, in which a one wavelength is used to read each drive. (8) It can also serve as part of an add/drop demultiplexer or (9) as components within the optical MODEM.

The combination of wavelength division demultiplexing and homodyne detection can be done in a variety of architectures depending upon the specific application and need. It can be structures from one cell, from combinations of fiber tunable cells, volume tunable cells, volume and fiber tunable cells, array of tunable cells, in an interconnect within a network architecture. This architecture can be used within WAN and LAN networking using all the well known topologies such as Bus, Tree, Ring Star; see "Local & metropolitan Area Network", William Stallings, fifth edition, Prentice Hall 1997). Or can be integrated on one substrate. For example, for telecommunication applications or endescopic applications, one would more naturally consider the possibility of using fiber optical devices, or micro machined devices such as MEMS. For imaging purposes such as parallel microscopy, tomography, atmospheric turbulence correction one would consider the possibility of using volume devices or arrays of micromachined tunable filters. For conventional microscopy as well as for reading, writing, and tracking purposes of CD, DVD and magneto-optics, we will introduce a new holographic tunable cell design. This tunable cell should have ability of focusing light as small as 10 nm. This should provide, for the first time, an optical microscopic design (not a near field optical microscopy design) which can detect objects in the atomic level scale, while the tunable cell will function simultaneously as a probe as well as the diagnostics tool. If a similar design is used for optical data storage, then this tunable cell should allow recording $10^5$ M bite/cm$^2$, with ability to function simultaneously as part of the known servo system for tracking and focusing. The feasibility of conjunction of this focusing device with other tunable element is also possible.

MEMS cells are the only tunable cells which have relatively wide ranges of tunability. However, MEMS are slow and mechanically unstable, and can't be used for TDM or heterodyne detection with very fast modulation. Therefore we also introduce a general approach for fabrication of tunable gratings over a large bandwidth of wavelengths; so that tunable gratings are used over wide ranges in the present invention. While a variety of tunable cells can be used in the present invention, a preferred cell is based on Bragg gratings, which can not only combine wavelength demultiplexing with various homodyne functionalities, but in an analagous way (according to the Kogelnic theory) it can combine all forms of holographic demultiplexeing (Angular, Rotational, Shift, wavelength or their combination) with all the various homodyne functionalities and TDM. Examples to be considered involve phase sensitive detection combined with deflection sensitivity, which is a very important functionality for the optical microscopy, Also the combination of routing with time-division demultiplixing can be accomplished with the present invention.

As known in the field of holography and electro magnetic theory, either change in the wavelength or the beam direction, are considered as changes in the k-vector of the beam.

In holography, grating efficiency is analogously sensitive in the K-vector variation, regardless of whether the variation comes from a change in the wavelength or the beam propagation direction or their combination. This should make any gratings devices based which can be implemented with wavelength variation also can be implemented with beam propagation direction variation or the combination.

The invention of K-wave selector based on thick Bragg gratings or holography can also have addition functionalities: (1) Spatial noise filtering ability. A significant feature for all diffusive microscopy and tomography as well as optical pick-up in multilayered data storage (2) wavefront de-encryption, a significant feature for atmospheric turbulence correction, and parallel microscopy and tomography. Wavefront deflection sensitivity is essential for numerous applications discussed herein such as microscopy, tomography, profilometry).

SUMMARY OF PREFERRED EMBODIMENTS OF THE INVENTION

The term "K-vector" along with Bragg matching, is discussed in one of the most fundamental papers in holography by Kogelnik (H. Kogelnik Bell Syst. Tec. J 48,2909–2947 (1969). See for example, U.S. Pat. No. 5,438,439 to Mok et al at col. 4 among others. The length of the vector indicates wavelength and the orientation of the vector indicates beam direction. Either change in the input wavelength or in the beam direction represents a detectable variation in the K-vector of the input signal. The invention involves the use of tunable cells comprising for example: Bragg cells, Fabry-Perot etalons and it MEMS version, interferometers, holographic multiplexers such as (wavelength multiplexers, angular multiplexers, rotation multiplexers or their combination). These devices can operate in the transmissive mode where light is transmitted through the device or in the reflective mode, where the light is further transmitted by being reflected off of the device. Some applications shown in detail below, involve telecommunication, CD and DVD optical pickup devices, and microscopy. The Bragg cell is currently the preferred "K-vector selector" for most of these applications, and the cell tuning source will preferably comprise a tuning cell control voltage source for producing an electrical control signal having a DC component and an incremental AC component. The DC component can select desired wavelengths or (K-vector and/or angle of incidence) of incoming light beams and the AC incremental component can initiate heterodyne detection of a desired frequency, amplitude or phase modulated light beam by hetrodyning the AC component with the applied modulated light beam signal, and a time integrating CCD camera can completely retrieve the detected beam modulations representing the transmitted intelligence. In the combined TDM and WDM (or K wavevector multiplixing) arrangement, the AC component turns the cell, preferably a Bragg cell on periodically during the time slots being demultiplexed or detected. In all embodiments, the AC component functions as a signal detector.

Regarding the aforesaid DC component, tuning control means in FIG. 5B applies a plurality of DC wavelength establishing electrical control signals to a K-vector selectable tunable cell for selectively altering the focal length of an electrically controllable lens means for in turn enabling reading data off of a plurality of variously positioned optical recording elements.

The invention employs a preferred method of demultiplexing a group of intelligence bearing light signals having different K-vectors and modulation K-vectors including the steps of: providing a K-vector selector (e.g. Bragg cell, volume hologram, interferometer) for simultaneously performing K-vector (e.g. wavelength) division demultiplexing and heterodyne detection of selected K-vector modulated (e.g. frequency, phase or angle modulated) intelligence bearing light signals from the group of incoming intelligence bearing light signals, and applying an electrical control voltage (or appropriate tuning source such as stress, temperature, magnetic force, and mechanical motion) across the K-vector selector having a DC component for selectively tuning the K-vector selector to a selected transmission K-vector corresponding to a particular value of the DC component for causing the K-vector selector to transmit the light signal having such a selected transmission K-vector (e.g. wavelength), together with an AC component having a temporal signal for selectively producing heterodyne detection on the selected signal, and time integrating the resulting signal to complete demodulation of the selected signal.

A preferred embodiment of the invention is shown in FIG. 5B wherein a single high resolution holographic pickup is provided in a single reader which can read both a CD 610 and DVD 608 optical recording medium. An electrical tuning control signal source 614 applies both a DC and an AC signal to a tunable Bragg cell holographic element 612, which AC signal is phase locked with respect to the fundamental repetition frequency of the recorded data on the CD or DVD to produce accurate tracking. A special high resolution holographic lens is recorded within the Bragg cell that focuses the light signals read off of the optical storage mediums upon a pickup detector means 616, and its focal length is varied to read a selected CD and or DVD from a group of CDs or DVDs in response to changes in the DC applied to the holographic element Bragg cell 612. The holographic lens within the Bragg cell is formed by an interference pattern produced by interfering light emitted from the tip of a one micron optical fiber 500 in FIG. 4, and a plane broad light beam from plane wave source 506.

BRIEF DESCRIPTION OF THE DRAWINGS

The various features of the invention will become more apparent upon study of the following detailed description, taken in conjunction with the drawings in which.

Figures 6A, 6B:
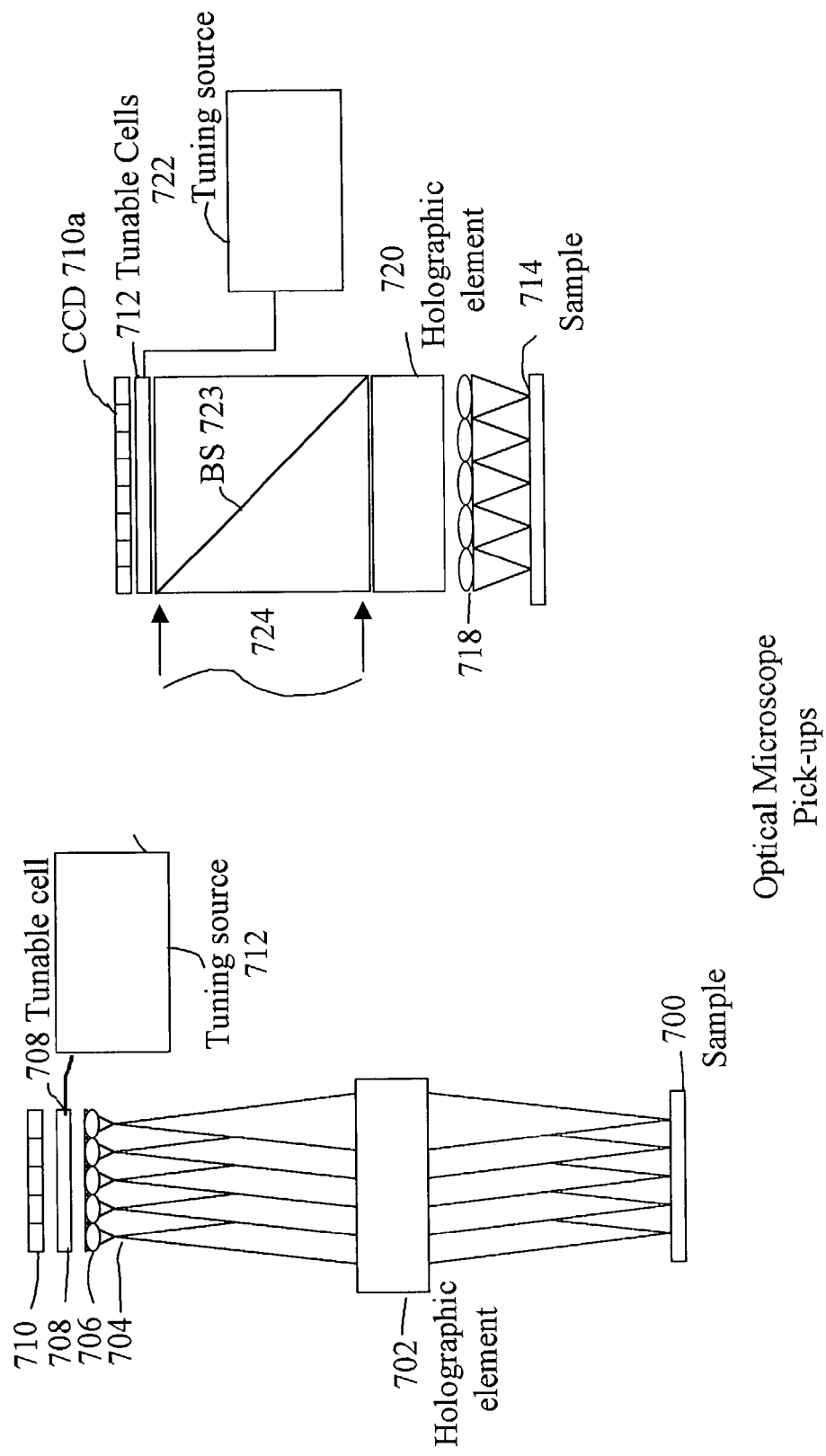

5(b) shows modified architecture, which is suitable for an optic pick-up for CD and DVD;

FIGS. 6(a) and 6(b) show different designs for a multi-head pick-up for the optical microscope;

FIG. 7: show a tune multiplex architecture for fabrication of extended range enhanced strength tunable Bragg cells (a) using interference between two beams (b) multiplexing via lithographic projection masks of gratings.

Figure 9A:
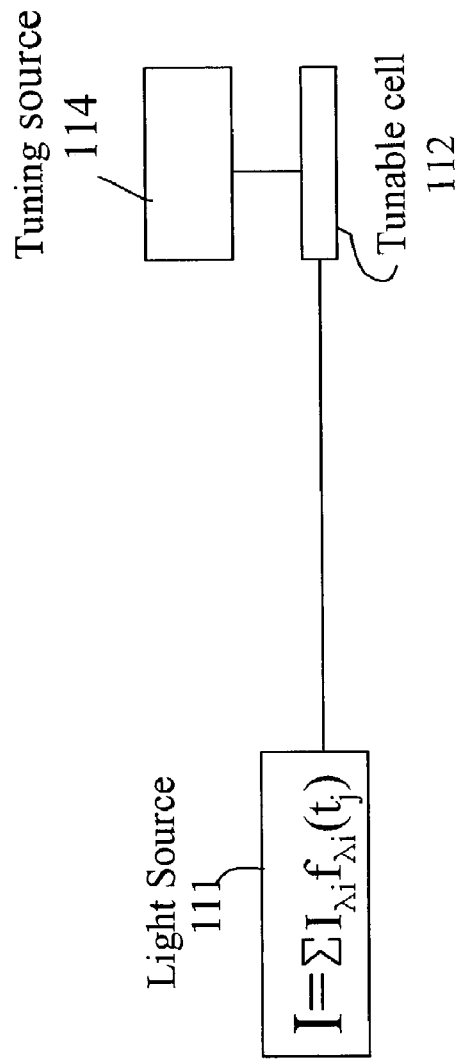
Figure 9B:
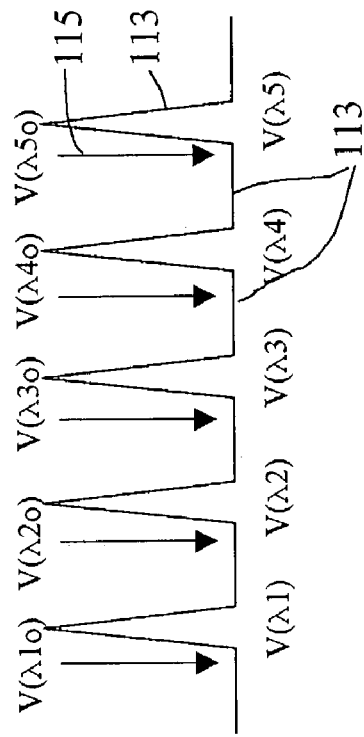

FIG. 8(a) is a schematic diagram of a prior art Hartmann sensor for wavefront measurement; 8(b) schematically illustrates a tunable volume based Bragg grating sensor for wavefront measurement and detection; and FIGS. 9(a) and 9(b) illustrate how WDM and TDM may be combined for various operations such as, for example, fiber optic data transmission or spread spectrum transmission in accordance with the invention.

Figure 10:
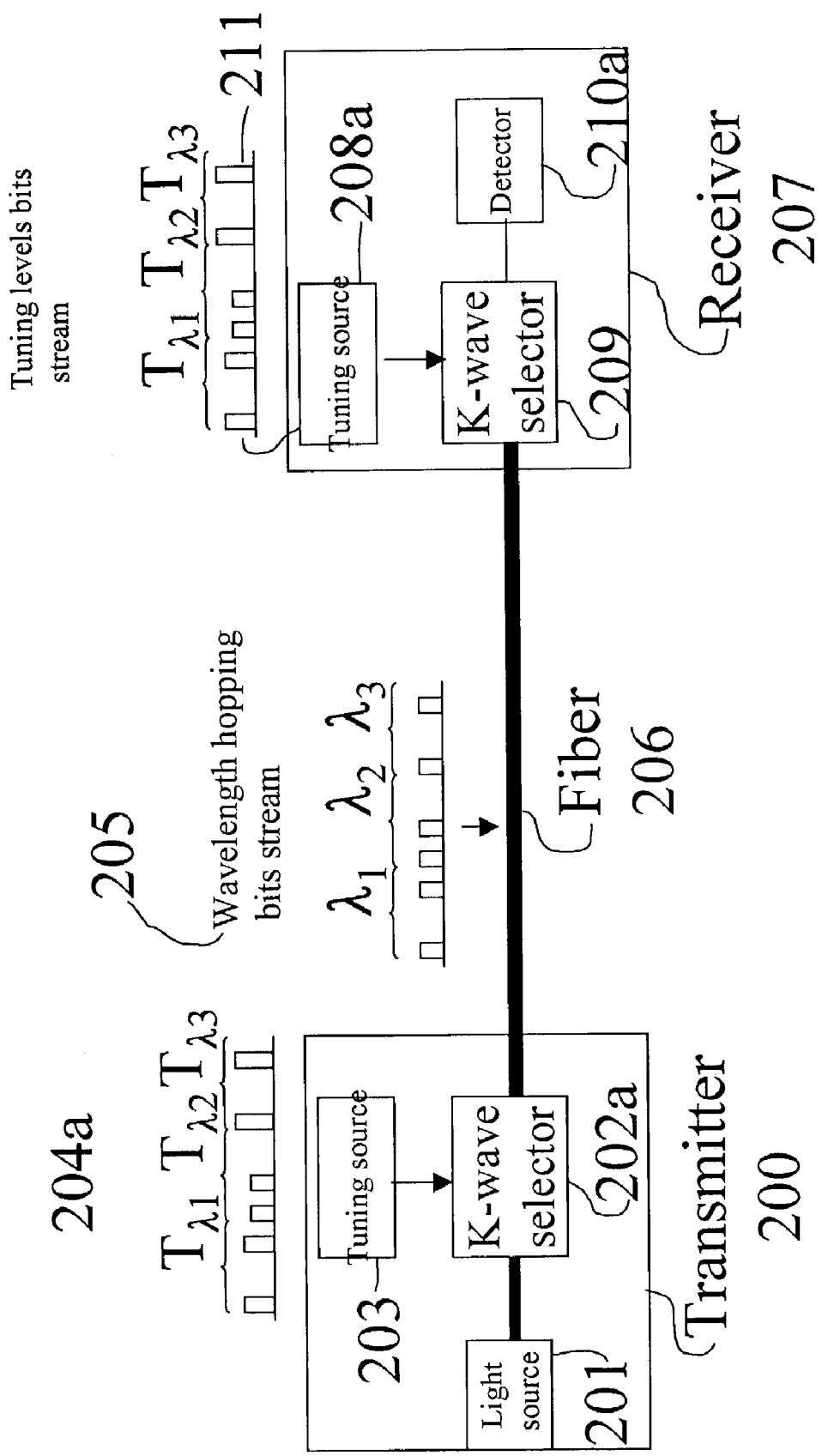

FIG. 10 illustrates the configuration of AND, spread spectrum configuration for secured data transfer.

Figure 11:
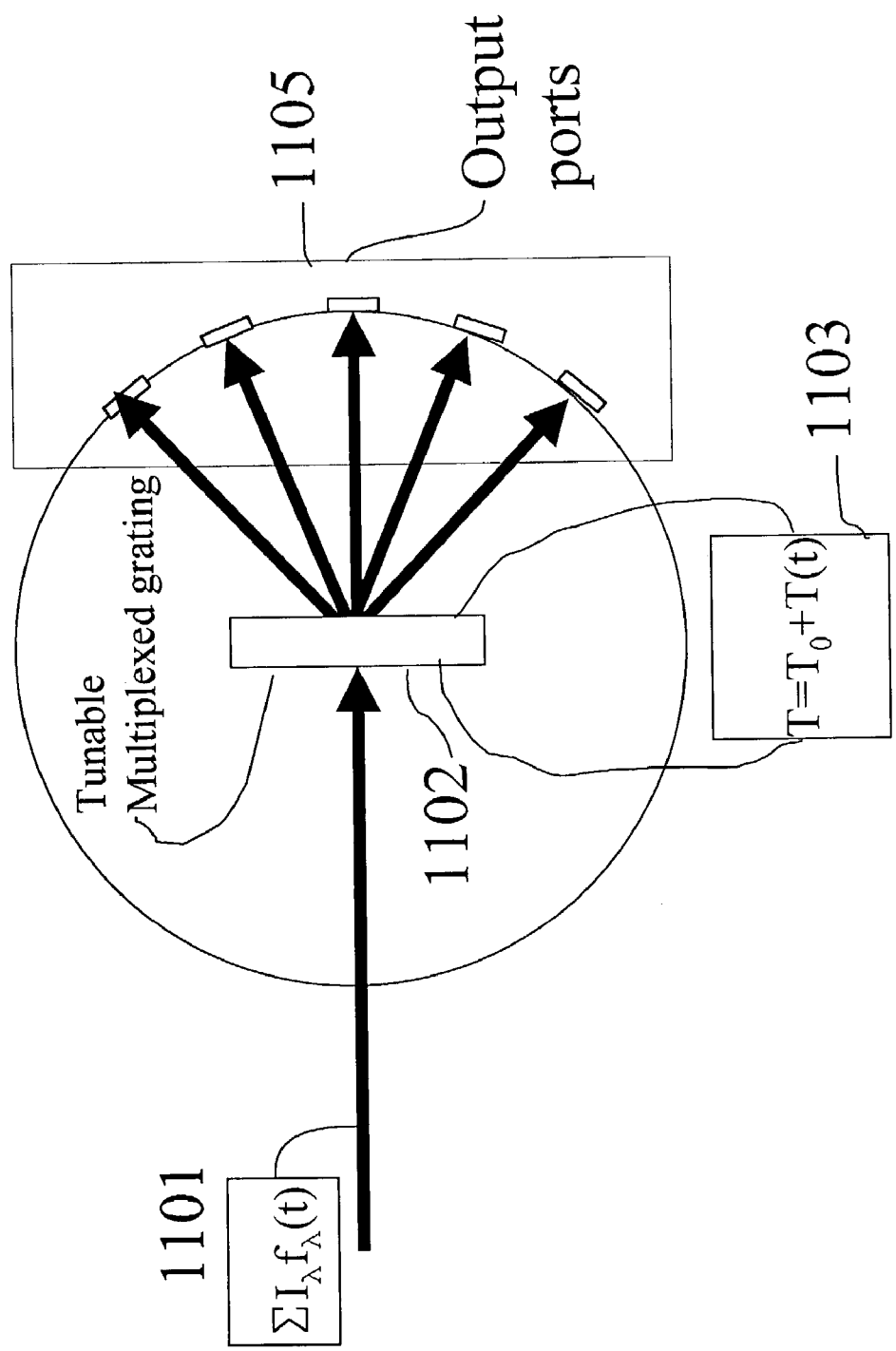

FIG. 11. Shows a k-vector selector space division router.

DETAILED DESCRIPTION OF PREFERRED EMBODIMENTS OF THE INVENTION

Figure 1:
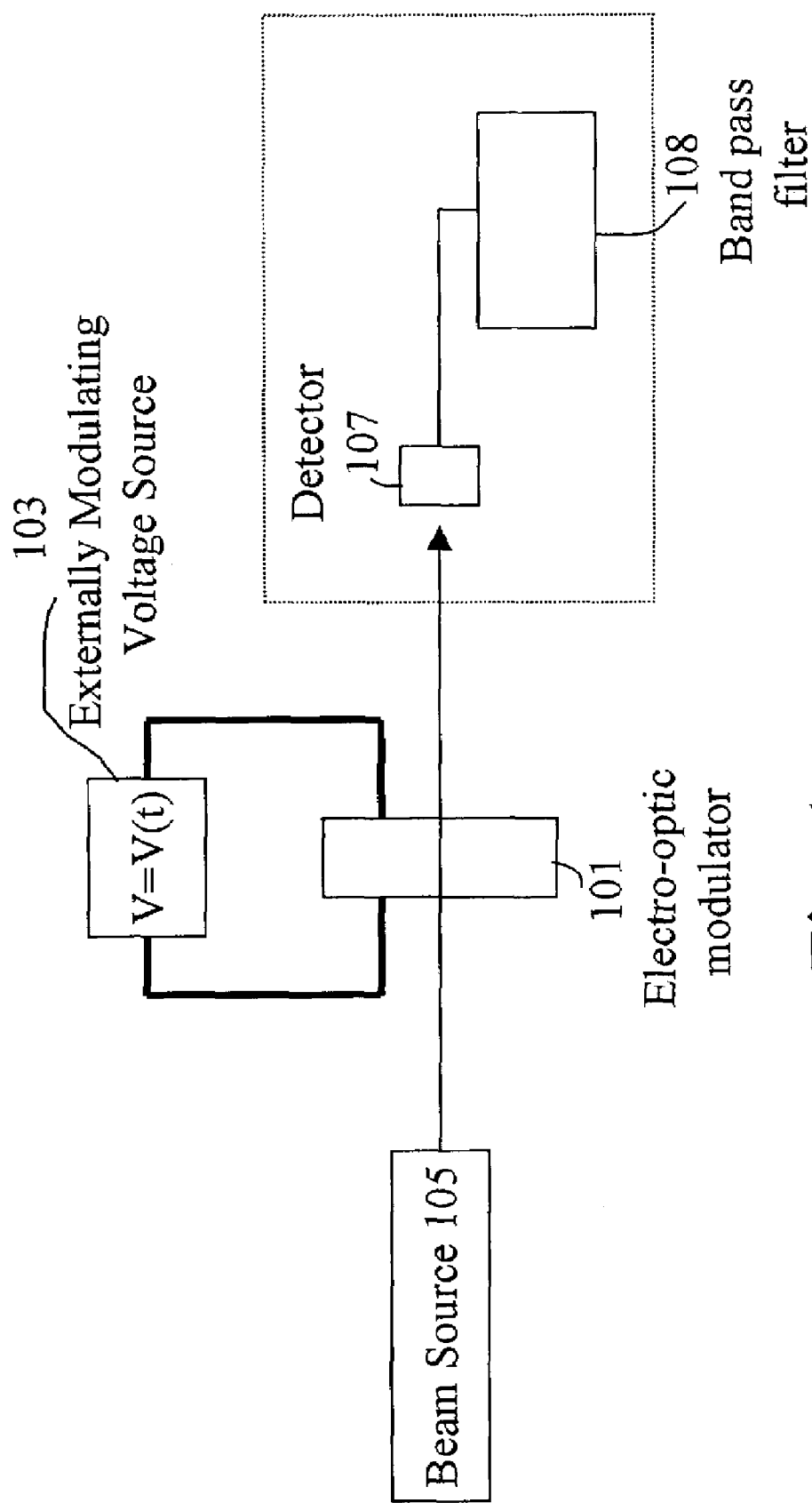
FIG. 1. shows a tunable cell homodyne and heterodyne detector.

FIG. 1 shows a tunable cell homodyne and heterodyne detector, employing a tunable cell. Let us assume for the sake of simplicity that the tunable cell is an Electro-optic modulator 101, which is driven by externally modulating tuning voltage source 103 and let us assume that the incident beam 105 on the electro-optic modulator 101 is also modulated. The light, transmitted through this electro-optic modulator, is collected through a time integrative device such as slow response photo-detector 107. This device is basically acting as homodyne and heterodyne detector. The mixing occur as result of transmission of the modulated beam from the electro-optic modulator. The time-integration is a consequence of detection with a photodetector which has slow response time together with band pass filter 108. In this embodiment of the invention, and in those that follow, it is not necessary that the tuning cell be an electro-optic modulator, it can comprise an acousto-optic modulator, elasto-optic modulator, thermal modulator, piezoelectric modulator, self-electro-optic modulation, even mechanical (see K. J. Ebeling, Integrated Opto-electronics, Waveguide Optics Photonics semiconductor Springer-Verlag, p 481–484) with the appropriate tuning source. For example in an elasto-optic modulator, the tuning control source should be a stress rather than a control voltage, while for the self Electro-optic effect, the tuning source is a modulated optical beam, the modulated beam creates a corresponding variation in the index of modulation according to Stak effect, Franz-Keldysh (see K. J Ebeling, Integrated Opto-electronics, Waveguide Optics Photonics semiconductor Springer-Verlag, p 453) effect. The last form of the tunable cell homdyne-heterodyne detector might have application in wireless telecommunication.

The combining of wavelength division demultiplexing with homodyne/heterodyne detection can be performed using either a one-cell approach or multiple cell approach. If the tuning cell has a strong tunability, then such a combination can be done with one cell, if the tuning cell has a very weak tunability, then multiple cells are needed. Near the end of the specification, I will illustrate how to convert a cell from small tunability into a large tunability.

It is possible to realize a device which can function simultaneously as wavelength division demultiplixing and frequency mixer. Most important interferometers such as Mach-Zehender Fabry-Perot, Bragg grating (in fiber, volume materials, structured stack of Electro optic material such as GaAs GaAlAs) can be used for this purpose. To achieve the two functionalities simultaneously, the tuning source has two components Dc bias component and an AC modulation component. The DC bias component is the one which is responsible for selecting the wavelength, that is, it is the one which is responsible for wavelength-division demultiplixing. The AC modulated component is the one responsible for achieving homodyne detection and time division demulteplixing and other sub-functionality to be explained. Regarding the DC bias component, tuning control means 614 of FIG. 5B applies a plurality of DC wavelength establishing electrical control signals to a K-vector selectable tunable cell for selectively altering the focal length of the electrically controllable lens means for in turn enabling reading data off of a plurality of variously positioned optical recording elements 608 and 610.

Figure 2A:
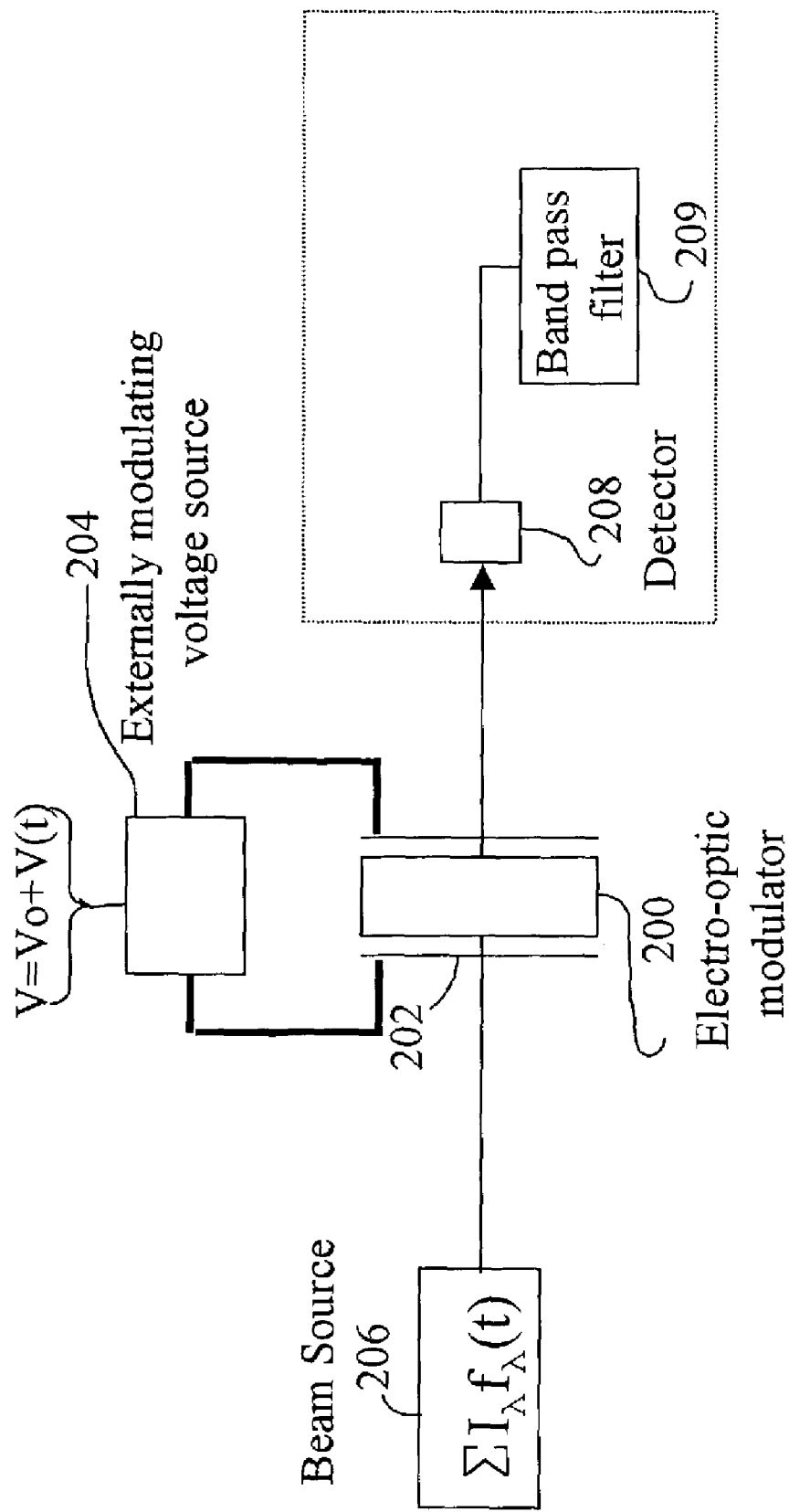
FIG. 2(a) shows a schematic diagram of simultaneous WDM and homodyne heterodyne detector implemented via electro-optic modulator which is sandwiched within the etalon of FIG. 2(B) but in this case the etalon and the electro-optic modulator are cascaded.

FIG. 2(a) shows a schematic diagram of a heterodyne wavelength division demultiplexing detector implemented via electro-optic modulator 200 which is sandwiched within an etalon (Fabry-Perot) 202 and externally modulated via a tuning control voltage source 204. In this scheme, a beam 206 (consisting of a combination of several beams, each of the beams is at it own wavelength and its time modulation), is incident on the sandwiched etalon. The transmitted light from the etalon is detected via time integrative detector 208 and bandpass filter 209. Importantly, this single device functions simultaneously as wavelength-division demultiplexer and homodyne heterodyne detector. Assume that our driving voltage is $V=V_o+v\ f(t)$, where $V_o$ is a constant bias and f is a periodical function. Then for each value of $V_o$, a certain wavelength will be transmitted (or reflected in a reflected mode device). On the other hand the periodical component of the voltage demodulates a selected signal according to f(t). Because each of the input beams at a certain wavelength is modulated, then the tuned cell acts as a mixer between the input beam and variable component of the voltage. The output detector with its supporting electronics performs the time-integration. For cells with very narrow band filtering and high modulation frequency of the tuning and the input signals, the cell can also act as low pass filter or time averaging device. This means that the process can be all optical, and there is no need for conversion to electronic signals.

Figure 2B:
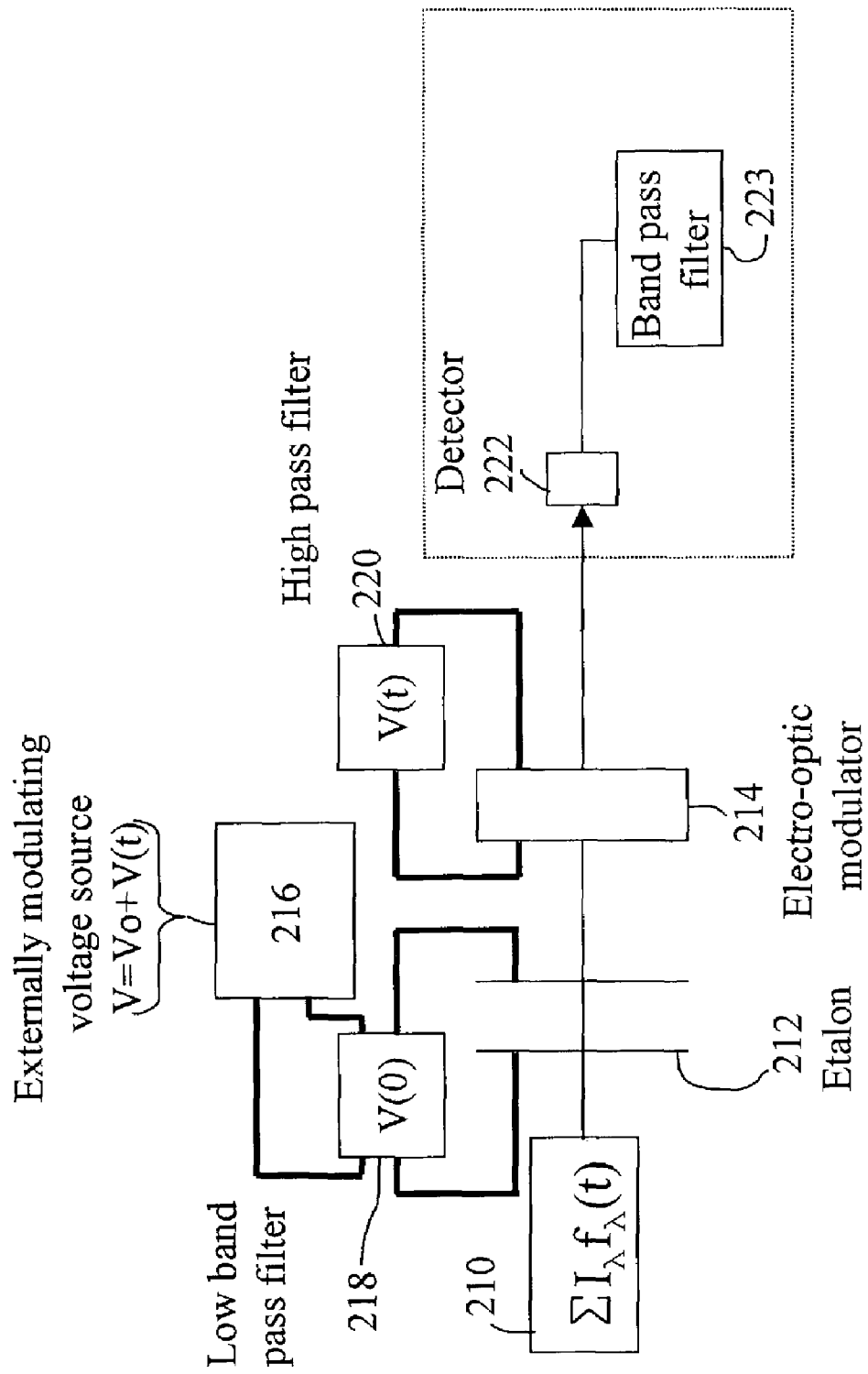

A disadvantage in using the above approach is that one my need to sacrifice wavelength selectivity for introducing several beams modulated with different frequency modulations. Another alternative, illustrated in FIG. 2b, is to cascade the electro-optic modulator 214 with the Fabrey-Perot etalon 212, which could be an interferometer. The DC output component from the tuning voltage source 216 passes through low pass filter 218 and is used to drive the etalon for selection the wavelength. The AC component from the voltage source passes through high pass filter 220 and is used to drive the electro-optic modulator 214 in order to achieve homodyne and heterodyne detection. In this embodiment, the etalon and EO modulator together comprise a single K-vector selector mentioned in the invention summary, photodetector 222 and BPF 223 function as in the prior figures. For an etalon or other WDM device with very narrow band filtering and high modulation frequency, the etalon can also act as low pass filter or time averaging device. However, for doing so the etalon 212 should be placed after the electro-optic modulator 214. Incidentally, the HWDM can be fabricated as one structure. One face of the electro-optic modulator can be shared with the etalon. If for example, one face of the etalon was a micro-machined membrane (References on tunable Fabry-Perote J. Peerling, A. Dehe, A. Vogt, M. Tilsch, C. Hebeler, F. Langenhan, P. Meissner "Long Resonator Miromachined Tunabel GaAs_AlAs Fabry-Perot Filter," IEEE Photonic Technology Letter. Vol. 9. No 9 September 1997 (2) E. C. Vail, et, al., GaAs micromachined widely tuneable Fabry-Perot filter" Electron. Letter., Vol. 32, P. 1888, 1996), then the whole voltage including V(t), can be applied to the membrane with no need for the low pass filter 223, as low pass filtering is achieved because the micro machined membrane will not be able to follow the fast temporal modulation of the optical signal. A SEED, or self electro-optic effect devices such as a pn junction, and which can be driven optically or electrically, can also function as a light detector. This should open the possibility of integrating the WDM, the modulator and the detector only on one component. Regarding SEEDS, see K. J Ebeling, Integrated Opto-electronics, Waveguide Optics Photonics semicondoctor Springer-Verlag, p 481–484.

Another elegant implementation is to provide a Bragg grating, one half of it being chirped, and is tuned for selecting the wavelength, the other half of it is not chirped and can be used for homodyne heterodyne detection. Thus, the number of various implementations can be many, depending upon what kind of cells well be used for WDM and what kind will be used for time modulation. If this device functionality is reversed then it can act as modulator which can combine more than one form of modulation. This modulator can be used as a part of multiplexer, which combine TDM and FDM and WDM.

For example, the combination of the three forms of modulation can be realised as follows. Instead of selecting a constant $V_o$, In FIG. 2(B), $V_o$ should be replaced by binary digital modulating signal, one level of the binary digital signal lets the etalon to transmit a certain wavelength, and other level off set any wavelength transmission, or transmit other wavelength which can be filtered out. While the Electro-optic modulator still function as frequency modulator, other forms of modulation such as phase or amplitude modulation can be replaced by frequency modulation.

Figures 3A, 3B:
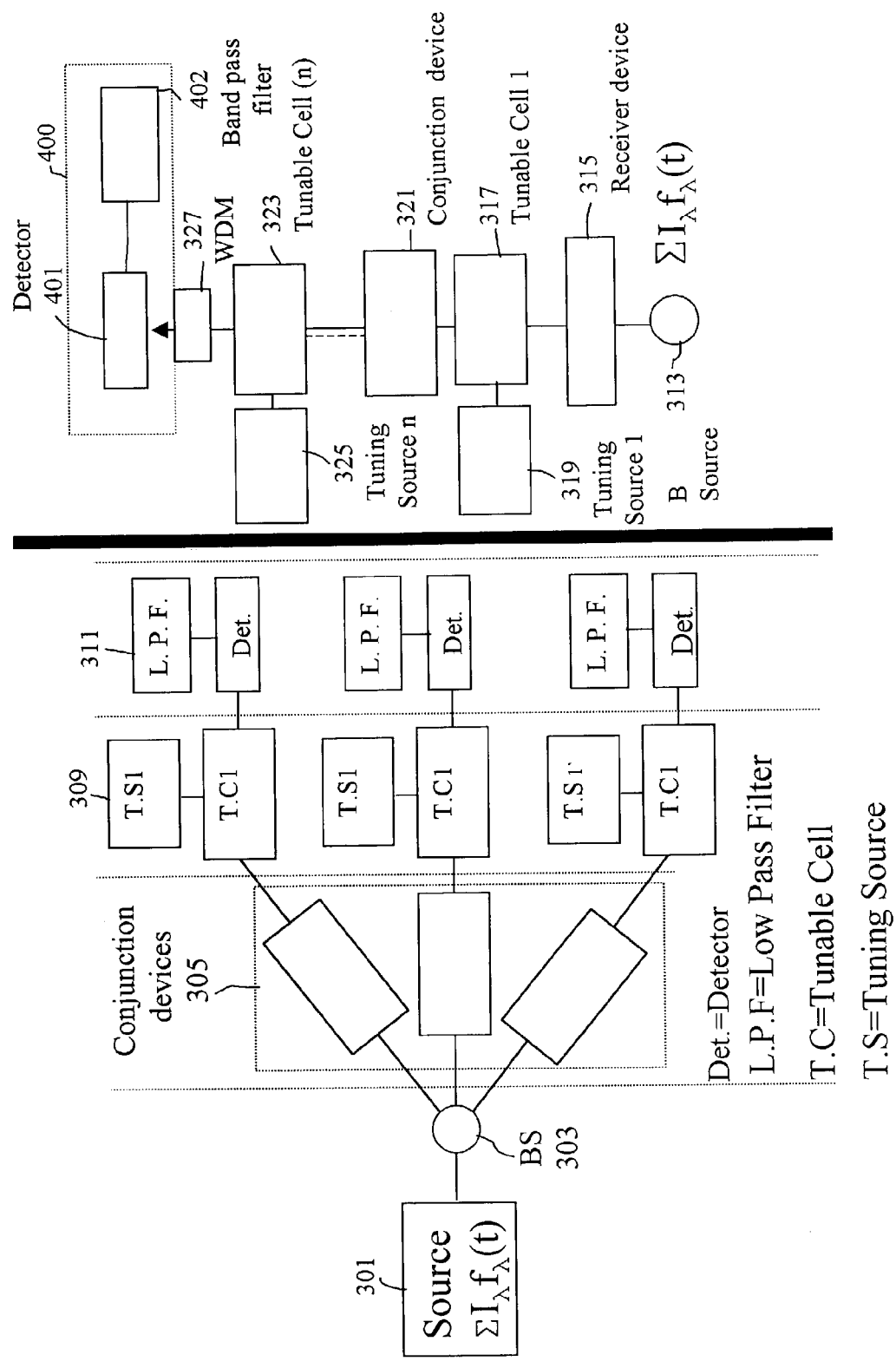
FIG. 3. shows (a) parallel (b) the serial architectures for combining wavelength division demultiplexers and homodyne heterodyne detectors utilizing conjunction devices.

In cases where the single tunable cell is weak, that is it doesn't have enough tunability throughout the desired range of wavelengths to be demultiplexed, then the single tuning cell arrangements of FIGS. 1 and 2 should be duplicated by cascaded or parallel plural cell structures in the manner illustrated in FIGS. 3a and 3b.

FIGS. 3a and 3b show the (A) parallel (B) serial architecture. The tunable cells are connected through conjunction devices, these conjunction devices can be either fibers, lenses, holographic elements with interconnect capability, in order to allow for whatever combination of tunable cells are desired for a specific design or need. Let assume for the simplicity at this stage that the conjunction devices simply are fiber wires, and the tunable cells are Bragg gratings. Several incoming carriers beams 301 carry information in the form of time modulation, frequency modulation of amplitude modulation. This beam is separated for n channels (in the drawing we show only 3 using the beam splitter 303. The light from the beamsplitter is transferred through the conjunction devices 305 to a set of tunable cells 307 in which each corresponds to a certain wavelength. Each of the tunable cells are modulated with an associated tuning source 309 in order to demodulate the signal via the set of time integrative devices 311, which consist of low pass filter with detector.

The device in FIG. 3(b) involves summation of several carriers beams 313 coming through a fiber from a remote distance. Each of the beams carries information in the form of time modulation, frequency modulation, or amplitude modulation; these beam are received by receiving device 315 e.g a fiber. The light is transmitted through the receiving device, and through several cascaded tunable cells, here we show only two tunable cells 317 and 323. These tunable cells are connected through a conjunction devices 321, (here we show only one), each tuning cell is tuned to work at certain wavelength and it modulated by its own tuning frequency to demodulate the signal. All the demodulated signals are received by the wavelength division demultiplexer 327 then to a time integrative correlator 400 which consist of detector 401 and band pass filter 402. These devices are suitable as part of a telecommunication system or as a part of fiber sensing device. However, because the conjunction devices can be lenses, or beam interconnect holograms, these devices can be designed to suite different application, as we will show next.

Conjunction devices can be utilized for transferring light from fiber tunable cells into volume tunable cells using Fourier transform lenses, and this design can be reversed. Also, the conjunction device can be hologram which can connect one beam to a number of beams in different sides of the hologram, Many architectures can employ the tunable cells in various ways. In both FIG. 3 arrangements, for very fast modulation, the tunable cell or the WDM can act as a band pass filter.

Regarding tunable optical pick-ups for optical storage and microscopy, several microscopes and tomographies have been reported in the literature, some of these microscopies are based on Doppler shift, others are based on deflection of the beam from the exact direction such as ultrasonic. Implementation of the scanning tomographic acoustic microscope for Multiple-Angle tomography Richard Y. Chiao and Hua Lee, P P 499–509, Acoustical Imaging Edited by Helmunt Ermert and Hans-peter Harjes Acoustical Imaging Vol 19), photothermal (reference on photothermal microscopy) (Photothermal refraction for scanning laser microscopy, Dean S. Burgi, Thomas G. Nolan, Jon a. Risfelt, Norman J. Dovichi, Optical Engineering, 756–758 (1984)), atomic force microcopies reference atomic force microcopies (scanning probe microscopy for testing ultrafast electronic devices, A. S Hou, B. A. Nechay, F. Ho, D. M. Bollm, optical and quantum electronics, 28, 819–814 (1996), profilometery (reference on profilometrey) (measurement of the local slope of a surface by vibrating-sample heterodyne interferometery: a new method for scanning microscopy, Kyuman cho, David L. Mazzoni and Christopher C. Davis, Opt. Letts, 18, 232–234, 1993) et, st and. Other microcopies rely on the fluorescent emission of light from cells or materials; see fluorescent atomic microcopy (M. Schader and S. W. Hell, H. T. M. van der Voort "Three-dimensional super-resolution with a 4Pi-confocal microscopy using image restoration," Journal of applied physics 84, 4033-. And some microcopies rely on combination of the above. For performing all these microcopies some form of homodyne or heterodyne detector may be employed.

Tracking and focusing elements in optical storage devices can employ some form of homodyne detector. See "Non-contact servo track writing with phase sensitive detection," U.S. Pat. No. 5,991,112 issued to Song et al. We introduce herein a tunable cell based optical pick up; this optical pick up is constructed holographically, on tunable holographic materials such as photorefractive materials. It can be constructed in interconnect geometries connecting one beam to another beam, in what ever form of multiplexing from wavelength multiplexing, angular multiplexing or tunable effect multiplexing. This should open the possibility of having optical pick-up devices for scanning different point on the target, or different depths, or it should allow ability of optical pick-up with different wavelengths in different locations and different depths. Furthermore, the holographic construction of such optical pick-up devices should permit construction of optical pick-up devices with very sharp focussing capability. It is well known in microscopy that the resolution is limited by the ability of optical components to focus beams (the diffraction limit of optics). The same limitation also applies to writing information on optical data storage devices. In optical microscopy, to avoid this limitation, it has been suggested to perform microscopy in the near field. In this case a nanoscale fiber tip is used to replaces the optical pick-up. Using this approach it was possible performing microscopy in the sub-micron regime. Most recently there were some reports on optical microscopy within the nanoscale regime (combination between near field microscopy with homodyne microscopy). The draw back in near field microscopy is that it can't be used on living organs or deep tissues in vivo.

Figure 4:
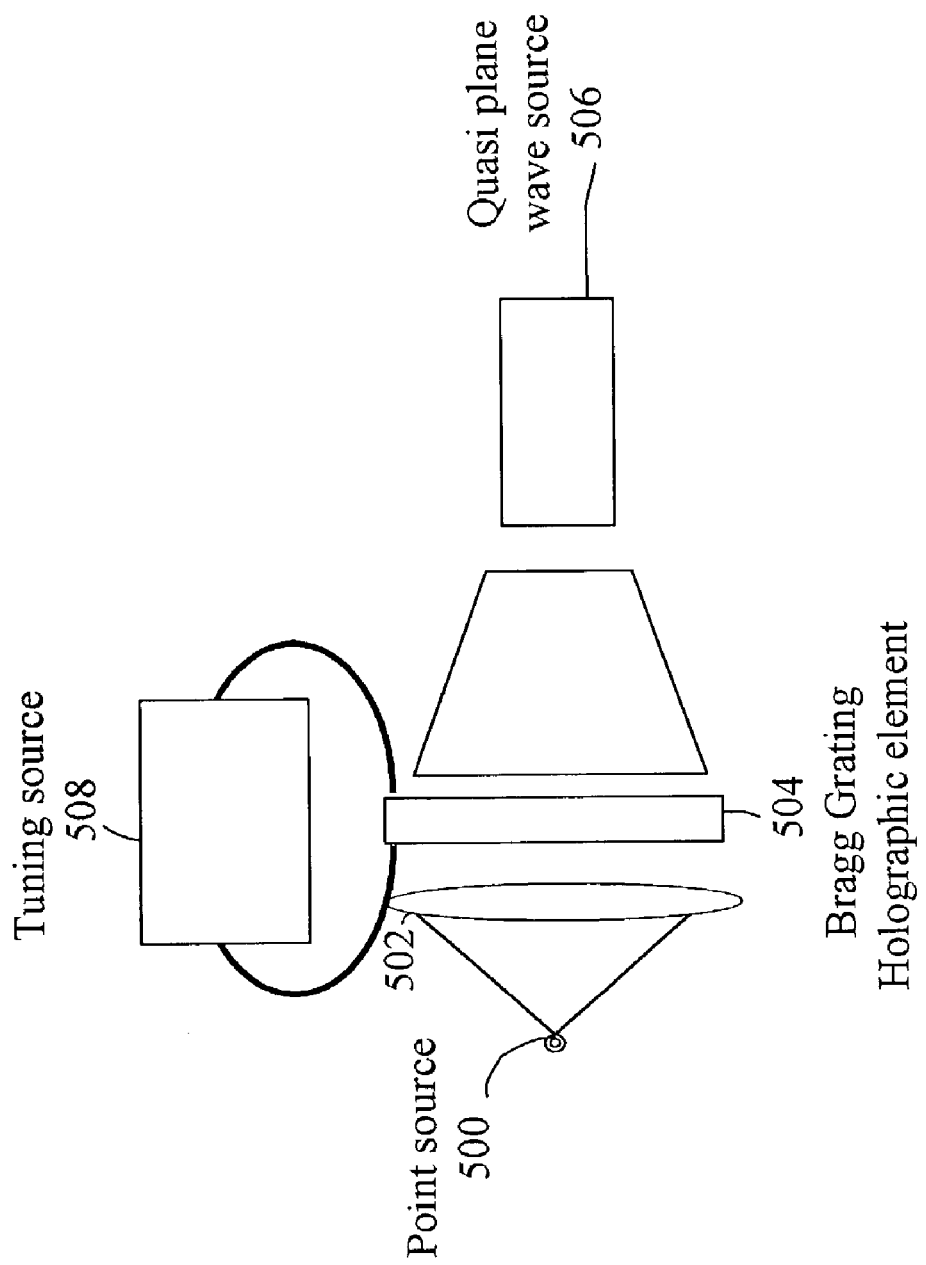
FIG. 4. illustrates fabrication of holographic lens elements with ultra high focusing capability.

For providing an optical pick up with very high resolution, I provide a holographic lens element which can be produced from interference between a beam originated from point source 500 of FIG. 4, and another beam from quasi-plane wave beam source 506, on a Bragg grating holographic element 504, all shown in FIG. 4. For extraordinary high resolution I suggest that the point source of light emerges from a fiber tip, or other very small transmissive, or reflective element, Most recently there were reports on fiber tips of 10 nm diameter optical fiber tips. See Shuji Mononobe and Motoichi Ohtsu "Development of a fiber fabrication application oriented near field probes." IEEE photonic technology letter. Vol 10, No 1 January 1998. For extra high resolution and to avoid the diffraction limit of optics due to aperture size I suggest eliminating an optical lens or element 502 entirely. For those holographic materials permitting recording of such a hologram, then this should allow construction of optical pick-ups for performing microscopy in the atomic level scale, and recording information in the optical storage in the atomic scale level. For example in one $cm^2$ using 10 nm optical pick-up, this should allow recording nearly $10^2$ Gpite/$cm^2$; nearly one hundred times the current density in use. There are some holographic material, which are tunable. For example LINbO3 and $KnBO_3$. is one of the holographic materials which is tunable via the Electro-optic effect. If the holographic material is tunable, then the optical pick-up can be made to function also as homodyne and heterodyne detector by adding the tuning source 508 during the pick-up process (for photorefractive material the tuning source is electrical). However, for avoiding anistropy I recommend that the tunable cell to be separated from the holographic lens shown in FIG. 6(B)

Thus, it is an important feature of the present invention to provide a method of producing at least one, and generally an array or number of non-diffraction limited holographic lenses comprising the steps of: interfering a point source of light from the tip of a single very narrow optical fiber, preferably having a diameter in the nanoscale region, e.g. ten nanometers, with a plane wave of light; and recording the resulting interference pattern on a holographic element, which can be the K-vector selector. This process is repeated over and over until an array of holographic lenses of a desired number are produced. These lenses are extremely useful in the microscopic imaging systems and CD, DVD optical readers to be described below. Of course, for each side-by-side lens to be recorded, the fiber tip is displaced an appropriate distance relative to the holographic element.

Importantly, in FIG. 5a discussed below, numerous point sources are projected at the sample by an array of holographic lens elements for ultra-high resolution, each element being constructed as described and schematically illustrated in FIG. 4. Such high resolution lens construction is also employed in optical pickups and DVDs discussed below. While the prior art holographic elements were micro fabricated, here we propose building it using holographic fixing approaches. The high resolution holographic lens discussed above based on fixing approach has advantages over a holographic element based on the micro fabricated one. These advantages are (1) The ultrahigh resolution as a result of interference between light coming from micro tips (2) de-encryption of the information using a thick holographic element (3) The ability of the holographic element to act as k-wave vector demuliplexer as well as a homodyne detector. (4) The ability to work as spatial noise filter As shown by the following publications and patents, holographic elements have been used with CD and DVD optical pickups; see for example the following references: (1) Akio Yoshikawa, Hidenyuki Nakanishi, Kunio Itoh, Takeshi Yamazaki, Tetsuo Komino, and Toru Musha. IEEE Transaction on componnents, Packaging, And Manufacturing Technology. Part, B. Vol. 18. No 2. May (245–249) 1995; (2) Shinya Hasegawa "Compact size magneto-optical head with a hologram and a beam splitting means," U.S. Pat. No. 5,751,682; (3) Kazushi Mori, Atsushi Tajiri, Yasuaki Inoue "Three beams generating diffraction grating, transmission type hologrpm optical element and optical pickup appaartus using the same,"; U.S. Pat. No. 5,717,674 (4) Shinya Hasegawa "Optical Head for optical disk drive," U.S. Pat. No. 5,708,644 Zu-Wen Chao, Tsung-ming Yan, Shin Ter Tsai, Jau-Jiu Ju, Pei-Yih Liu "Single-lense optical pick-up head for accessing a DVD and CD Disk by switching between two optical states," U.S. Pat. No. 5,748,602.

Figure 5A:
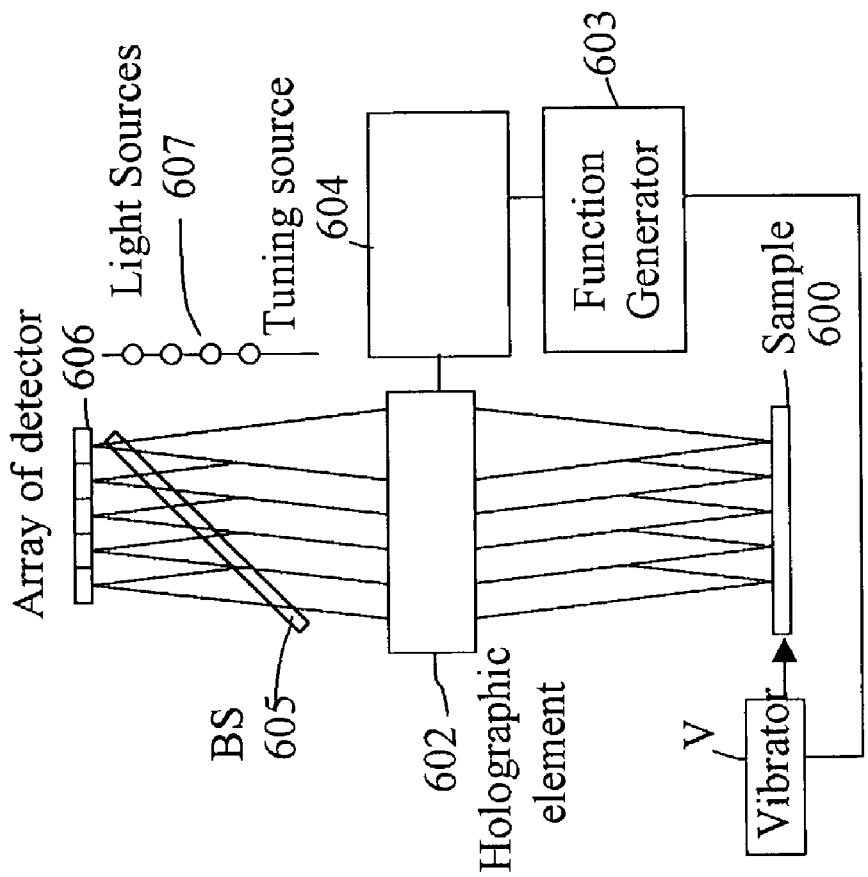
FIG. 5.(a) shows architecture for microscope multi-head optical pickups for very high resolution.
Figure 5B:
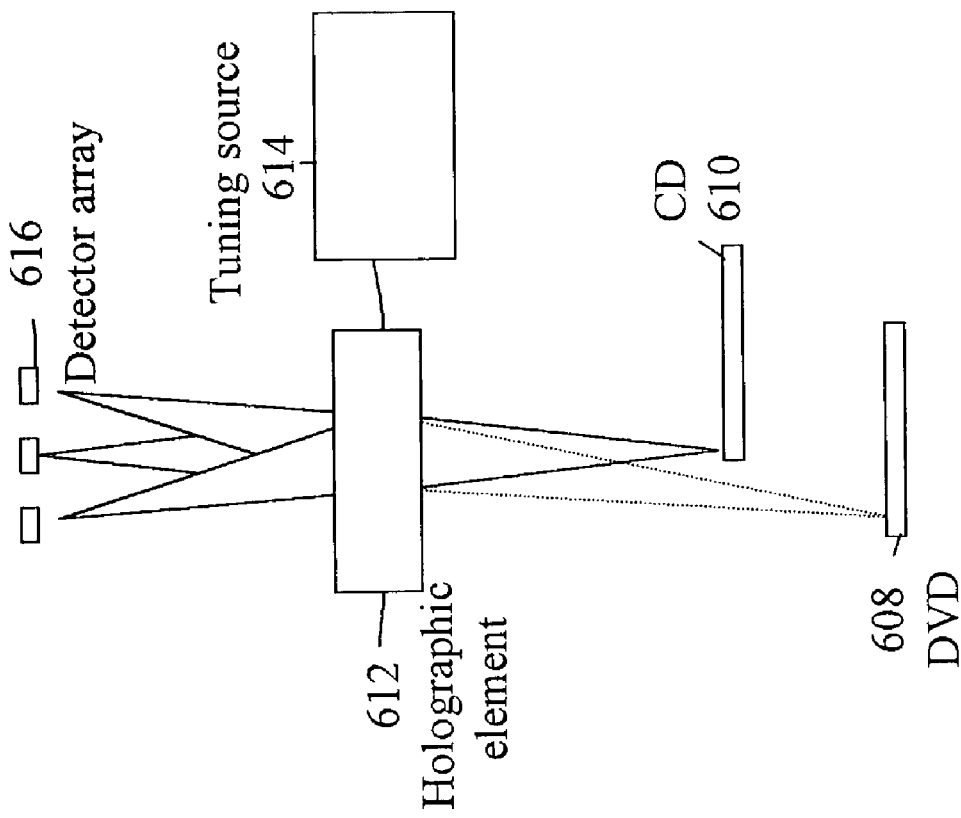

Most optical pick ups for writing and reading data on optical data storage devices have three ports, one for reading the information, and two for servo systems; one for focusing the pick up correctly and the other for keeping the optical pick-up in track FIG. 5(b). Usually a phase sensitive detector is a part of the servo system. The optical pick-ups can be constructed in interconnect and multiplexed (wavelength and angular) geometries, in order to have as many as output port and readout heads. For example, in most optical data storage systems three output ports and one head for reading the information are employed. One of the out ports is utilized for reading the information the other two for the servo system for purpose of accurate tracking and focussing. There were also some reports on optical pick-ups with two-readout head; see (Zu-Wen Chao, Tsung-Ming Yan, Shin Ter Tsai, Jau-Jiu Ju, Pei-Yih Liu "Single-lens optical pick-up head for accessing a DVD and CD Disk by switching between two optical states," U.S. Pat. No. 5,748,602, one for reading CD and other one for reading the DVD. In optical microscopy, it is possible to construct pick-ups with multi-read heads each being interconnected with its special port. For fluorescence microscopy it is possible to construct the pick-up with tuning capability for various wavelengths. The interconnect can be either in transmission or reflection geometries, If the holographic materials are tunable, then the optical pick up can serve as a K-wave selector as well as homodyne and heterodyne detector.

Ultra-High Resolution Microscopic Embodiments

FIG. 5(a) shows an optical microscope using a multiple-head optical pickup made as discussed in connection with FIG. 4, for very high resolution. Such a head can be constructed using a holographic storage and focusing means 602 for connecting point sources on the sample 600 to point sources on the detector array 606. This optical pickup herein simultaneously serves as a multi-head pick-up tunable cell that is driven by the tuning source 604 for performing heterodyning and color selection. If for example the holographic element is LiNbo3, then we can use the holographic elements also as a wavegiude for integrating the detector In heterodyne optical microscopy, the specimen or its associate probe or associated probe membrane is often oscillating. These features are essentially employed in most forms for microcopies. Light scattered from oscillating objects is usually associated with Doppler shift as well as deviation in the beam orientation, which is essentially a change in the K-vector wavelength. In holographic pick-up systems, this is going to change the Bragg conditions and hence the intensity of the transmitted or reflected light. If the pick-ups also functioning as wavelength division demultiplixer, then it possible to perform Foliage averaging; see Part 1: Foliage Attention and Back scatters Analysis of SAR images, J. G. Fleischman, S. Ayasli, E. M. Adams, D. R. Gossetin. IEEE transaction on aerospace and electronic systems, Vol. 32, No 1 January 1996 P 135–14.

The microscopic sample 600 is vibrated by vibrator V. The purpose of this vibration is to modulate in time and space the focussed beams, produced by pinpoint light source array 607 projected through the holographic element 602 via beam splitter 605. The holographic element also has focusing lenses such as fresnel lenses recorded therein. The tuning source 604 and the transducer vibrator V are phase locked together by a function generator 603 with phase locked capability, so that the function generator drives the microscopic sample 600 while the holographic element 602 simultaneously operates as a K-wave vector heterodyne detector. The CCD image detector 606 is operating as a time integrating device for each focused beam so that microscopy occurs in parallel. The DC level component of the tuning voltage source 604 can be beneficially adjusted for in turn adjusting various desired wavelength ranges of light for specimen examination as desired by those skilled in the microscopy art. The AC component is used to perform the heterodyne detection of retroreflected light scattered out of the sample. This creates a map of the surface roughness and granularity of the sample in two dimensional data acquisition. The optical microscope pickup apparatus of FIG. 6a is similar to FIG. 5a except that the K-wave vector selection is done in separate tunable cells 708. The focussed beams 704 from holographic element 702 are converted into plane waves by lens array 706 and are inputted into the tunable cells of cell array 708. The sample specimen support stage vibrator is phase locked with the tuning source 712 as in FIG. 5a, and the use of a discreet array of light sources with the beam splitter is as described in connection with FIG. 5a. Such a discreet array of light sources, e.g. 607 in FIG. 5a can be eliminated by the use of a plane wave 724 and beam splitter 723 passing through the holographic element and focussed via a microscopic lens array 718 shown in FIG. 6b; also tuning source 722 is coupled to the tunable cells 721 as in FIG. 6a. FIGS. 6a and 6b show two different designs for the multi-head pick-up for the optical microscope. In FIG. 6(a) the holographic element 702 functions as an interconnect element between point sources on the sample 700 and the point sources at 704 on the other side of the holographic element. A microlense array 706 is used to convert the point sources of light into plane waves. These plane waves are incident to tunable cell 708, which can be an array of cells, which function simultaneously as wavelength division demultiplexers as well as homodyne and heterodyne detectors. The tunable cell is driven via the tuning source 712.

The design in FIG. 6A, was illustrated using a holographic lens to obtain ultra high resolution, for standard resolution, the holographic lens is not necessity, and simply can be replaced by an array of lenses with the tunable K-waves-selector FIG. 6(b) shows another alternative architecture wherein the point sources 714 on the sample are interconnected to generate a set of plane waves directed at holographic element 720. A microlens array 718 is used for generating plane waves propagating within the holographic element 720, though in general, the structure can be designed without the micro-lens array element through an appropriate interference design of the holographic element. The out put from the holographic element 720 goes through a tunable cell 721 which functions simultaneously as a WDM and homodyne heterodyne detector. This cell is driven via the tuning source 722 and a plane wave 724 is directed at the holographic element via beam splitter 723.

CCD 710a is also provided as before. For the purpose of compactness, the tunable cell and the holographic element can be also integrated. FIGS. 5a and 6(b) can be modified according to the form of the microscopy. For example, in ultrasonic microscopy, the oscillating sample can be replaced by oscillating membrane overlaying the sample. For implementation of the scanning tomographic acoustic microscope for Multiple-Angle tomography, see Richard Y. Chiao and Hua Lee, PP 499–509, Acoustical Imaging Edited by Helmunt Ermert and Hans-peter Harjes Acoustical Imaging Vol 19). In photothermal microscopy the vibrator can be replaced by modulated laser beam (Photothermal refraction for scanning laser microscopy, Dean S. Burgi, Thomas G. Nolan, Jon a. Risfelt, Norman J. Dovichi, Optical Engineering, 756–758 (1984)). In atomic force microscopy, the vibrator is replaced by fast electrical field modulation of the sample from a Cantilever chip, and the laser beam instead being scattered out of the sample. It scattered out of the Canilever chip (scanning probe microscopy for testing ultrafast electronic devices, A. S Hou, B. A. Nechay, F. Ho, D. M. Bollm, optical and quantum electronics, 28, 819–814 (1996). In fluorescent microscopy a spectrum is emitted form the sample and hence therefore the K wave selector should function as spectroscopic time integrative correlator; see (M. Schader and S. W. Hell, H. T. M. van der Voort "Three-dimensional super-resolution with a 4Pi-confocal microscopy using image restoration," Journal of applied physics 84, 4033, 1999).

For most microscopes, a phase locked template should be applied by tuning source 604 to the tunable K wave vector selector, namely element 602 in FIG. 5a, or tunable cell 708 in FIG. 6a. This template should be locked to the received light via the K vector selector. The phase locked template can have oscillatory behavior or a bundle of frequencies depending on the form of microscopy. Also, it may be noted that the phase locked template, which may be used with fluorescent microscopy also, may be usable with hyperspectra automatic target recognition.

CD DVD High Resolution Optical Pick-Ups

FIG. 5(b) shows modified architecture which is suitable for an optic pick-up for CDs and DVDs. In this case two different point sources of light 610 and 608 are provided, each of these point sources is interconnected through the aforesaid high resolution holographic lens elements in holographic element 612, to three points on detector array 616. In this case, the holographic element 612 functions simultaneously as a pick-up as well as mixer driven by the tuning source 614. The point sources of light in the fabrication process can be designed to be operating in different wavelengths; the holographic element can also be designed to switch between two different wavelengths, one to be used for reading a CD point source 610, and other to be used for reading a DVD point source 608. Or it can be designed to enable switching to different focusing levels in order to be able to read multi-layered data storage media, or to read volume data storage. For example if the holographic element is LiNbO3, then we can use the holographic elements also as a waveguide for integrating the detector.

The DC voltage component applied by tuning source 614 to holographic element 612 can be used as before to select the wavelength which in turn can produce focussing at point 610, or alternatively at 608 to accommodate different CDs or DVDs as indicated in FIG. 5b, or to accommodate different focal depths, which need not necessarily be of the same wavelengths. The three detectors of detector array 616 are conventional for CD tracking, focussing and detection as is well known.

For the purpose of tracking, the aforesaid AC component of the tuning voltage is used to perform phase sensitive detection on the light, which is reflected off of the data storage medium. The phase sensitive out put should be fed back to a servo system in order to adjust the focussing point as well as the tracking. In the normal operating condition, the AC tuning component applied to the holographic storage element 612 should have the same frequency of the light which reflected off of the CD, DVD data storage media. However, when the pick-up goes out of tracking, the frequency of the light, which is emitted from the data storage media, is changed, or even can go to higher harmonics. This phase sensitive output signal fundamental frequency established by the spacing of the pits on the CD. These changes in the frequencies should make significant changes in the phase sensitive out puts, and these changes can be fed back into the servo system (not shown here) to readjust the focusing or the beam scan position on the storage medium being read. For these prior art details of tracking adjustments, see U.S. Pat. No. 5,793,718 to DeCusatis, and U.S. Pat. No. 4,385,74 to Wilkinson.

The holographic element FIG. 5(b) can have several functionalities, (a) it can function as a focusing lens (b) homodyne and heterodyne mixer (c) interconnect element (d) demultiplixer to focus on different focussing depths which also can employ different wavelengths. These functionalities can be carried out by separate components rather than by the same component, and in fact can be separated (either in a completely separate component or in an integrated structure, similar to the separate component arrangements in FIGS. 6a and 6b.

The tuning of the focal length occurs as follow, the holographic lens should be produced so as to focus at different focal depths when the read out light changes color as shown in FIG. 5b. The change in the read out color of the holographic lens is controlled via the DC component of the tuning voltage signal applied to the tunable cell. If the holographic lens comprises a thick holographic element, several advantages can be had: (a) higher sensitivity to the deviation of the pick-up when goes out of track, (b) high sensitivity in reading the information recorded on the data storage medium (c) the possibility of designing lens with variable focussing depth according to the wavelength, (d) possibility of designing a pick-up with ultra high resolution as mention above for higher data storage and/or smaller CD readers, though for this feature it is not necessary that the holographic lens to be produced having a thick holographic element, but could be recorded in accordance with the fiber tip feature of the present invention shown in FIG. 5.

However, the optical pickup of the present invention could still be beneficial if a standard lens or a microfabricated holographic lens is employed, rather than these desired enhancements.

The present invention based on thick Bragg gratings or holographic elements can have addition functionalities:

(1) Spatial noise filtering ability; a significant feature for diffusive microscopy and tomography as well as optical pick-up in multilayered and volume data storage (2) Wavefront measurement or de-encryption, a significant feature for atmospheric turbulence correction.

(3) Wavefront deflection sensitivity which is significant for microcopy, tomography, profilometry.

In addition, all of the tunable K-vector demultiplexers, which need not be relatively thick, also have the following functionality's (4) Phase sensitive detection: For example if the input beams are modulated with same frequency, as the tuning source, then the output from the detector should be dependent of the difference of the phase modulation of the input and the tuning source.

(5) Frequency converter: If the input beams and the tuning source are modulate with frequencies which are slightly different, then, the output from the detector should have signal which dependent on the frequency difference of the input beam and the modulating source.

(6) Base band demodulator: If both the input beams and the tuning source have same carrier frequency. Further if either one of the tuning source or input beams is also base band modulated, then the output from each the K-wave vector selector should be base band signal.

(7) frequency division demultiplexing: If the input beam consist of superposition of several beams, each beam with its is own frequency, and further if the tuning source is tuned to one of the frequencies of the input beam, then the corresponding modulation in the input will be enhanced at the out put for producing frequency division de multiplexing.

(8) Time integrative correlator: If the input beam is modulated via a certain template and tuning source is modulated with another template, then the out put from the detector should correspond to the time integrative correlation between the two templates. This time integrative correlation can operate either on digital or analog signal.

Correlation of digital signals for example is suitable for data gram recognition in the internet.

(9) Spectroscopic correlator: Spectroscopic correlation is very similar to time correlation. In this case the input template is a spectrum which is variable with time, and the transmissivity of the WDM or K-wave selector is tuned in time (via the tuning source) to match a certain spectrum. If the tuning source modulates the WDM transmissivity (or reflectivity) to match the input spectrum, then we can say spectroscopic correlation has been achieved. If the tuning does not match the variation in the input spectrum, then we can say that cross correlation has been achieved.

(10) The AND Logic Gate: In this case the incoming signal is digital binary information, and the applied AC voltage on the K wave selector is also binary synchronous with the received signal, then the device is acting simultaneously as K-wave selector and an AND logic gate. This feature might have many application include datagram processing in telecommunications or other applications in optical computing Regarding strengthening tunability, that is widening the frequency or wavelength range response, one of the main features of the present invention, is having a tunable cell, which can act simultaneously as WD Multiplexer and mixer for homodyne and heterodyne detection or other operation such as the AND gate. As I indicated previously, since most candidate materials do not have large dynamic range of tunability, then a technique is desired for expanding the tuning range.

One of the main methods nowadays for producing WDM is to use the Bragg grating. WDM has been produced using both in volume holographic materials, fibers and stacks of electo-optic materials using standard techniques of thin films deposition. In these cases the tunability is not large and is insufficient to permit one cell to have tunability over a large dynamic range. Only recently some reports were made available producing a tunable Bragg grating in fibers; See for example, (1) demonstration of thermally-polled electro-optically tunable fiber Bragg grating (OSA) Meeting San Clara, Calif. (1999) Paper W13) (2) H. Mavoori, S. Jin, R. P Espindola and T. A. Strasser. "Enhanced thermal and magnetic actuation for broad-range tuning of fiber Bragg grating-base reconfigurable add-drop devices," Opt. Letters. 24, 714–716 (1999). In one of the reports they used thermal and magnetic tuning sources, which are not flexible.

Figure 7B:
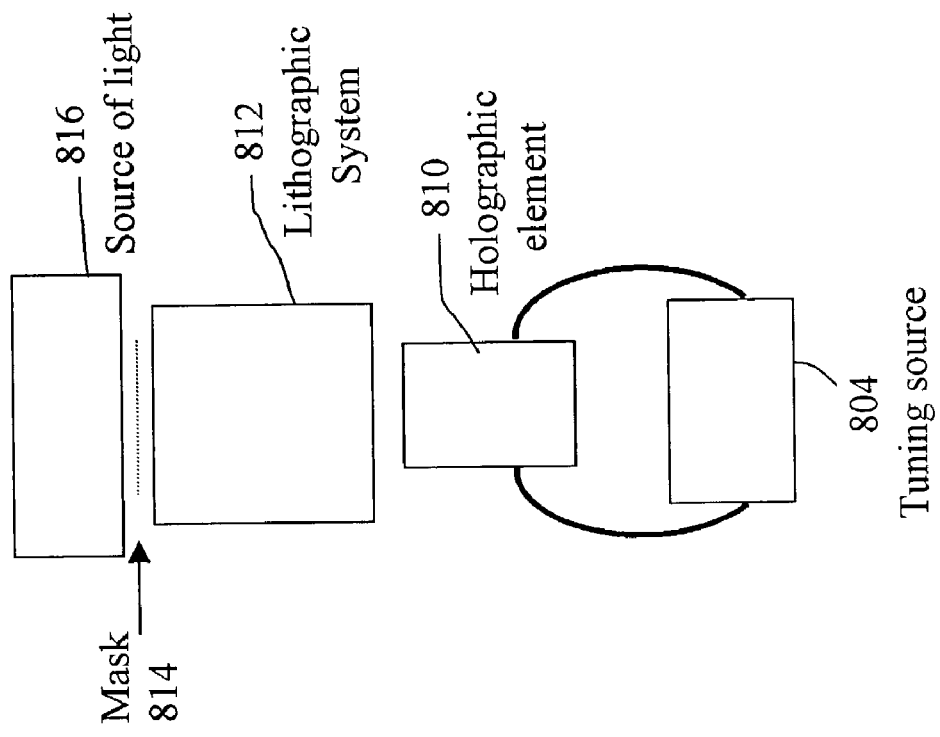
Figure 7A:
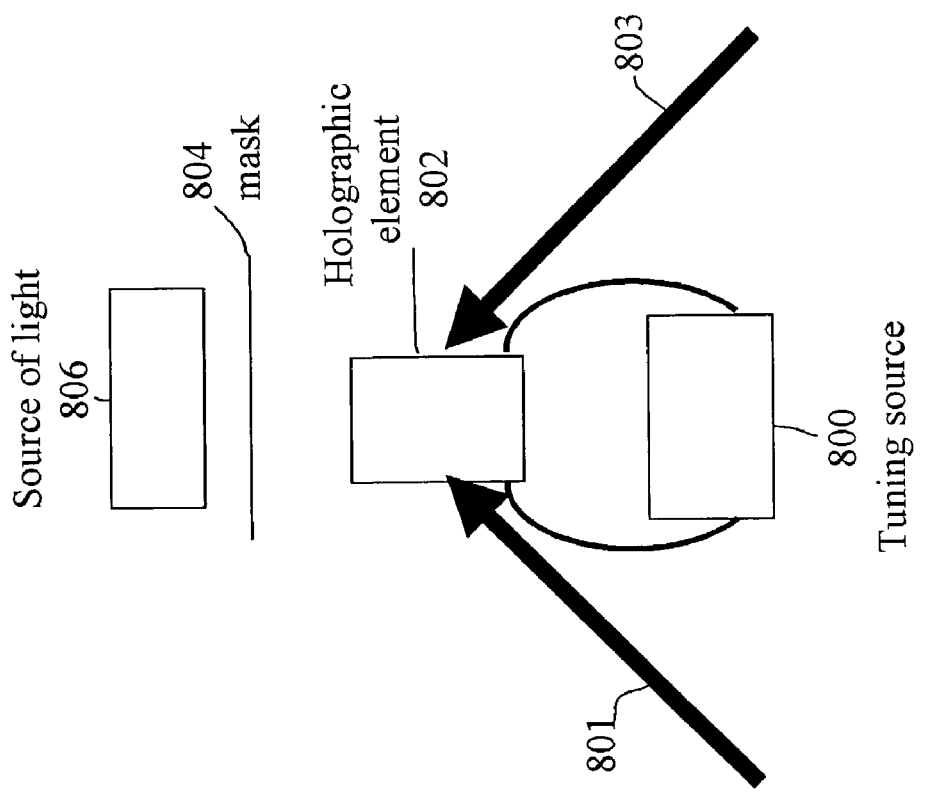

Therefore, I propose herein a method for making a Bragg grating to be tunable over a large dynamic range of wavelengths. I call this approach tune multiplexing. In the tuning multiplexing shown in FIG. 7a, a tuning source DC tuning signal, preferably a voltage, is applied by tuning source 800 across the material of holographic element 802, while a Bragg grating correspond to a certain wavelength in accordance with the Bragg condition, is recorded in the material. In FIG. 7(A), we can record the gratings via interference between two beams 801 and 803. After recording a first grating, a new appropriate DC bias is applied by the tuning control source 800 across the holographic element 802 followed by recording a new grating, which is suitable for the new wavelength. This process is repeated until many gratings are recorded and multiplexed in the holographic element. The approach of FIG. 7(B) is similar except that the grating is recorded in element 810 via lithographic projector 812, utilizing a source of light 816 and a projection mask 814. Also ionic implementation techniques accompanied with tuning can be used for replacing lithographic approaches. For increasing the tunability of the holographic filter, it is recommended to record gratings by a combination of wavelength and electrical multiplexing. A paper of Michal Balberg, Meir Razvag, Ele Refaeli and Aharon Agranat, "Electric-field multiplexing of volume holograms in paraelectric crystals", Appl. Opt. 37, 843–847 (1998) teaches electrical field multiplexing of images for the purpose of data storage. In contrast our technique produces gratings. In this combined multiplexing (utilizing tunable laser such as a dye), many gratings are recorded, each corresponding with a different wavelength as well as a different electrical field. The tunability is achieved usually in any holographic materials with a large electro-optic coefficient. Tunability over a large dynamic range is realized in holographic materials with quadratic electro-optic effect such as $KnBO_3$.

Thus, our approach combines wavelength and electrical multiplexing using interference patterns to write the gratings. My approach combines k-wake vector multiplexing with any tuning source with any method of writing the grating. This is in contrast to Balberg-Arganat which was directed to holographic storage of images in volume material Through the reading process, if beam of light which consist of several wavelength is incident on the this Bragg grating, and tuning source voltages of increasing value are applied across the grating, then the Bragg grating should scan the various wavelengths. If a particular wavelength is to be selected by the demultiplexer, an appropriate DC voltage, or other appropriate tuning source, is applied to the grating. However, multiplexing many gratings in this manner can be complicated and require many steps of grating recording and is not very practical from a fabrication point of view. Therefore I prefer to produce only one grating which is the resultant grating of the entire multiplexed series of gratings. Assuming the central wave vector of the multiplexed grating is given by Ko, and the number of the gratings which need to be multiplexed is 2 m, with separation of $\Delta K$ between any two neighboring multiplexed gratings, then the resultant multiplexed grating is given by $$G(x) = e^{ik_o x} \sin c(\Delta kmx) \quad (1)$$

For the linear electro-optic tuning source it is possible to write that $$\Delta k = \frac{2\pi n}{\lambda_o} \left[ \frac{\Delta \lambda}{\lambda_o} + 2\pi n^3 r \Delta E \right] \quad (2)$$

where n is the material index of refraction, $\lambda_o$ is the central wavelength, and $\Delta \lambda$ is the wavelength difference between neighboring channels, r is the effective electro-optic effect $\Delta E$ is the increment in electric field in order to make the grating step one channel in demultiplexing.

The above equation allow one to set up the grating specification, such as the central wavelength, number of channels, and the electrical tuning levels.

In the case of the lithographic fabrication of the mask, see FIG. 7b, it is sufficient to multiplex one mask which has transmissivity proportional to G (x). In the case of holographic fabrication, all that is needed is to attenuate the grating exp(iKoX) recording by white light source 816, which is proportional to sinc ($\Delta$Kmx) made by a mask 814 or 804 in FIG. 7A using incoherent to coherent conversion processing techniques. The variation in the sign of sinc ($\Delta$KX) from positive to negative can be overcome by encoding it as a transmissivity mask by values of 0 and 1 (instead of −1,1) and this should gave an approximated solution. sinc($\Delta$K mX). This is not the only form of mask, other masks are appropriate depending on the tunability with other tuning sources, as is known in the art, e.g. we may wish to multiplex several chirped gratings.

A fringe pattern according to equation (1) can be produced via interference between two wide slits, therefore storing the projection of the interference of the diffraction pattern from two slit with a plane wave should be a straightforward method for production tunable grating over many wavelength. This approach may be extended also for WDM base on tunable acoustic-optic tunable filter, where one can make the tunable acoustical grating to be generated via interference between two square acoustical pulses (see for example (Optical network A practical respective, Rajiv Ramaswami and Kumar N. Sivarajan p 115 Morgan Kaufmann Publishers Inc.) Though for doing this it is better to use to acoustical transducers.

Also one might think about an encoding approach for an easy technique of fabrication a grating, which is tunable over many wavelengths. One encoding approach, which I suggest, relies on encoding the above grating, by a grating, which has a variable K vector. Another approach, which I suggest, is encoding the grating in binary form or other alternative form. For example, in the grating spacing coding forms one can select grating vector K (x)=Ko+$K_1$(x) so that at least for the first order approximation should gave $$e^{i(k_0 + k_1(x))x} \approx G(x) = |G(x)| e^{r(x)} = e^{ik_0 x} \sin c(\Delta kmx) \text{ grating.} \quad (3)$$

Making the real part of the above equation (3) equal, then it is possible to show that $$k_1(x) = \frac{\text{arc}[\sin c(\Delta kmx)]}{x} \quad (4)$$

In the binary coding form, one might select that $$\gamma(x) = \begin{cases} \varphi_1 & \text{for } \gamma(x) \geq \pi \\ \varphi_2 & \text{for } \gamma(x) \leq \pi \end{cases} \quad (5)$$

where φ1, φ2 are two phase steps or two absorption steps or a combination thereof. Adding the amplitude mask should be optional.

These coding approaches should not only make it easy to fabrication grating with lithographic approaches, but should also open the possibility of fabrication of gratings using a stack of multi layers Electro-optic materials using a standard microelectronics and thin films deposition fabrications procedures, or ion implementation approaches. The latter has significance in fabrication wide range tunable distributed feed back lasers. It is possible to employ similar approaches to the above, based on superposition of chirped gratings. A chirped grating has narrower band pass filter than a grating with a constant k vector, thereby to increase the number of available channels. This tunable grating can be employed as a part of an add/drop wavelength-time multiplexer, in order to produce a tunable add/drop element. (Optical network A practical respective, Rajiv Ramaswami and Kumar N. Sivarajan p 100 Morgan Kaufmann Publishers Inc).

We have discussed the possibility of fabricating a Bragg grating which is tunable in wavelength, but it is possible to make an angular grating combined with tune multiplexing, which should have an application in designing a router for telecommunication purposes. It is will known in holography, according to one of the most fundamental theories (see H.

Kogelnick, Bell Syst. Tec. J. 48, 2909 (1969), that grating transmissivity or reflectivity is sensitive for both the wavelength and the angle of the incident light. This important feature can be used to advantage by the present invention in the following areas (a) deflection phase sensitive detection (b) wavefront phase decryption (c) Speed decryption (d) Spatial noise filtering.

Regarding deflection sensitive detection, suppose that there is optical pick-up made from a thick holographic element, and this optical pick up is collecting light from a certain medium, e.g. CD, DVD, Magneto-optic disk, or a certain form of a microscopic medium. This light can be deflected from its original direction, due to any of the following reasons: (a) going to new track, (b) deviation from the focusing condition, (c) reading a new cell. Then the light which is reflected or transmitted out the optical pick-up is a function of the deviation. Therefore, the measure of this deviation from the standard direction is one way to decode the information on the medium. For CD applications see: Masud Mansuripur, Chapter 31, Optical society of America, Handbook of optics I); see In microscopy, "Implementation of the scanning tomographic acoustic microscope for Multiple-Angle tomography Richard Y. Chiao and Hua Lee, PP 499–509, Acoustical Imaging Edited by Helmunt Ermert and Hans-peter Harjes Acoustical Imaging Vol 19).

In optical microscopy, tomography, CD, and DVD applications, the light that is deflected from the medium is decoded by a partial blocking of the beam and demodulating the light via lock in detection.

However from a holographic point of view, there is no difference between deviation in Bragg condition in terms of wavelength or angle. Both deviation are analogous from holographic point of view; see the following reference re the mismatch from Bragg conditions either by deviation in the wavelength or the angle: H. Kogelnick, Bell Syst. Tec. J. 48, 2909 (1969).

This means instead of designing homodyne/heterodyne detectors based on mixing between frequency modulation and the tuning source, it is possible to design homodyne heterodyne detector which function by mixing angular deviation with tuning source. This feature should be extremely significant for most forms of optical microcopy-tomography, CD and DVD.

Regarding noise filtering, suppose the optical pick up is collecting light being diffused within a portion of the body of a patient under medical examination, or from light scattered by a cell in a multi layered optical storage device. Through propagation of the light from the required cell to the holographic element, the light is going to suffer from scattering. This scattering produces optical noise. The noise generally doesn't satisfy the Bragg conditions, therefore it intensity is going to be degraded significantly after reflection or transmission through the holographic element. Also, light scattered from oscillating or other moving objects is usually associated with Doppler shift; essentially a change in the wavelength. In holographic pick-up systems, this is going to change the Bragg conditions and hence the intensity of the transmitted or reflected light.

Regarding measuring wavefronts of light, in transmitting images within the atmosphere, it is essential to measure wavefront aberrations. The common way to measure aberration is to use Hartmann sensor. The prior art Hartman sensor of FIG. 8(a) consists of an array of micro lenses 900, pinhole array 902 and CCD camera 904. The wavefront is focussed via the lens array at different locations depend on the deviation of the wavefront. The variation in focal points is a function of the shape of the wavefront and it can be measured via the pinhole array 902, using the CCD camera to measure the intensity of the transmitted light.

My Bragg grating can be used as an alternative replacement of the expensive Hartman sensor. Assume that a Bragg grating was fabricated as result of interference between two plane waves or deposition via a stack of thin films layers. Then if Bragg grating 906 in FIG. 8b was used to receive a wave 907 coming from atmosphere, the wavefront of the beam is going to be decoded, depended on the slope of the beam wavefront, by the provision of CCD 908. The variation in the beam wavefront is an indication of its slope, and has a direct relationship with K-wave vector variation. The variation of the wavevector is going to change according to the transmissivity or reflectivity of the Bragg grating, and hence the wave vector is going to be detected, measured or decoded. Thus in accordance with the present invention, a wave front of light of an incoming light beam is measured by providing a K-vector tunable Bragg cell grating 906, directing the incoming light beam at the Bragg cell grating; and measuring an intensity pattern of light emanating from said K-vector Bragg cell, by for example a CCD detector 908, for indicating variations in slope of the wave front tuned at a selected wavelength.

This use of the Bragg grating has other advantages over the prior art Hartman sensor. If the Bragg grating is tunable over broad band of wavelength, then this should allow diversity in measurement of wavefront. This diversity is important to determine accurately the absorption and the aberration results from the atmosphere. Such a diversity is impossible to perform with conventional Harman sensor.

The tunable Bragg grating can also be used to decode the shape of the wavefront of plane waves scattered from moving objects in both phase and amplitude. This feature can be used in Lidar application to measure the wind speed in aircraft flights. Using my broadband tunable cell, advantageously allows a diversity in measurements over many wavelengths in contrast with prior approaches.

Another application, which may be considered, is to perform two dimensional homodyne heterodyne detection associated with deflection sensitivity, on an oscillating object in a future non-scanning mode, with a broad beam to determine its topography. The two dimensional Bragg grating can perform simultaneous homodyne detection on both Doppler shift and the instantaneous aberration on beam wavefront.

Regarding the time-wavelength division demultiplexer, we previously described how to combine wavelength division demultiplexing with frequency division demultiplexing. However, frequency division demultiplexing is used primarily in analog telecommunication systems, rather than in digital telecommunication systems. We now illustrate how our previous scheme can be used to combine time division and wavelength division demultiplexing. FIG. 9a shows schematically a single channel time-wave length division demultiplexing process. A beam of light 111 consist of superposition of n beams with different wavelengths, all beams are incident on tuneable cell 112, which is tuned by the tuning voltage source 114. Let also assume that that each beam of the n beams carries m synchronised time slots. An example would be transmission of information from n different buildings, and in each building there are m apartments. For each building a certain wavelength is allocated for sending the information and for each apartment within the building, a certain time slot is allocated. We would like to demultiplex this information. Let us assume that the cell 112 has been designed to have n switching on modes represented by the peaked triangles 114 of FIG. 9b, and also n switching off ranges 113 between the on modes as shown. In the jth switch on mode a reflection (or transmission) of the jth wave length occurs, and to achieve this, tuning of the tuning source for Tj level is required. The switch off ranges correspond to the DC levels of T where there is no transmission (or reflection) of any wavelength. However, it is more practical to select the switching off mode within the switch off ranges, so that these switch off modes 113 are nearby the switch on modes 114 as indicated by the arrow heads 115 in FIG. 9(b) For demultiplexing incoming information at a certain wavelength j and within a certain time slot i, the simplest way, is to perform synchronised tuning of the cell to level Tj in the time slot ti, so that simultaneous time and wavelength division demultiplexing occurs. However this approach can have some drawbacks. For tunabillity over many wavelengths, the voltage source should quickly jump between numerous tuning levels with the required speed. For example, if the tuning source is electrical, it may be required that the tuning source have both high voltage and high current, and such a requirement can be burdensome. A more practical approach is to divide the tuning levels into two components, a large DC component, and a small incremental AC component. The DC component should be adjusted to establish one of the tuning off levels 115, which is nearby the tuning level of the required wavelength, and a small incremental synchronised component is added to switch on the required wavelength. This incremental component will be produced within the desired time slot, and thus the cell is periodically turned on during the desired time slot. The cell is periodically turned on during other time slots and at various wavelengths depending upon the DC level associated with the desired incremental time slot pulse.

Hence, for this application, the fluctuating (AC) component, or temporal detection signal, of the tuning control voltage does not function as a frequency mixer heterodyne detector described in prior embodiments, but instead periodically turns the Bragg cell on and off at the various selected wavelengths to produce simultaneous TDM and WDM demultiplexing. Thus, the fluctuating temporal signal in this embodiment comprises a series of time slotted pulses. Two different time slots will thus usually have two pulse trains phase shifted with respect to each other.

In the case where the tuneable cell doesn't have enough tunability or tuning strength with respect to the tuning source, then the weak tuning cell can be replaced be cascaded or parallel cell structure as described in FIG. 3. In this case each tuning cell may be designed to have two switching modes, one which is opaque, the other one transmitted (or reflected) at a certain wavelength. However, these architectures are more complicated. To avoid large number of connections and to avoid the requirement having which require wide range of tunability, I would recommend a solution, which lies between one tuneable cell approach and many tuneable cells approach. In this case it possible to design the tuneable cell to have more than two switching modes but not all modes.

We have discusses combining frequency wave demultiplexing and time wavelength demultiplexing, However, it is possible to combine all of the above discussed forms of multiplexing and demultiplexing simultaneously. To do so, two cascaded tuneable cells, one for time modulation, driven by frequency modulator and the other one which function as time-wavelength division demultiplexer and a time slot switch which is driven by the pulse generator. The time division demultiplexing can be described as a special operation mode of the time integrative correlator. This mode of operation can be considered as very long time integrative correlation between the input and a binary pulse of certain slot. Additional applications of the present invention include spread spectrum communication and frequency hoping, a known technique which was used in Radar systems and wireless telecommunication to prevent jaming (Local & Metropolitan Area network, William Stalling 1977 by Prentice-Hall, Inc 1977 p 367–372). Frequency hoping is used in both digital and analog system. My wider range tunable cell can be used for such a purpose. Slower MEMs or other tunable devices are not suitable for this purpose. In frequency hopping system, either the analog or the binary data is fed into modulator, such as frequency shifting keying (FSK), the resulting signal is centered around a base frequency. A pseudorandom signal generator. At each successive bit of the random signal, a new frequency is selected from the table. In the reception end, the spectrum of the signal is demodulated using the same pseudorandom signal, which is used during transmission. The proposed modulators can be used for this purpose. The DC term, which is used for WDM, can also be used also for frequency hopping purposes in both the transmission and the receiving end.

Regarding TCP/IP header recognition: TCP/IP is the most frequent protocols used in network technology. TCP stands for transmission control protocol, and IP stands for Internet protocol. For IP address recognition, my AND logical gate is used for this purpose. For example if there a sequence of bits in the data gram, such as 00010010, the receiving host or router must generate a similar bit sequence and use AND logic gate in order to recognize the IP address. The tunable device can be used also as an AND gate. For recognition an address with 00010010 sequence of bits, the AC voltage should simply be modulated synchronously with the same bit sequences of the incoming message. If the results match for all of them, then this should be the right address, if they don't match, then the address is the wrong address.

Two main advantages this optical recognition has over electronic recognition using my AND gate.

are
(1) The bits of are not necessarily monochromatic, this means more IP addresses can be added
(2) It is possible to combine frequency hoping coding with the IP address, such a combination is impossible to achieve using conventional approaches.
(3) Can increase the number of addresses in LAN, MAN and WAN networking.

FIG. 10 shows the configuration of combined AND gate and frequency hopping for secured telecommunication. In the input section, the transmitter 200a consist of light source 201, K-wave frequency selector 202a, which is driven by the tuning source 203 via a stream of bits of different tuning levels indicated at 204a. The level of these bits 204a is selected in a way to generate light pulses of equal intensity, but with different wavelengths as indicated at 205. This stream of light pulses 205 are transmitted within the fiber 206a. At the receiving end, the receiver 207 consists of tuning source 208a, K-wave selector 209 and detector 210a. The tuning source of the receiver, synchronously drives the K-wave selector 209 with similar bits shown at 211, coincident in time with the bits generated by the transmitter tuning source 203 in order to be able to accept the whole message. Thus, the tuning level control pulses at 204a generated at the transmitter by tuning source 203 will be synchronized with, and produced at the same time with, the tuning level control pulses 211, generated at the receiver. The manner in which this synchronization is performed is known to those familiar with the frequency hopping technique. One approach involves simultaneously reading the same pseudo-random number table at the transmitter and the receiver to generate the synchronized control pulses. If the tuning level control pulses have equal amplitudes, the AND gate function would be retained without the advantageous use of frequency hopping.

Regarding Space Division Routing Demultiplexing, the present invention can be employed to demultiplex light beams within a fiber optic space division demultiplexer or router mixer. For a constant incoming beam wavelength, the aforesaid DC component applied to the tuned Bragg cell can be changed to select the angle of incidence of an accepted beam of a number of beams directed at the Bragg cell at various input angles. In a similar way, there is also the possibility of achieving angular tune multiplexing in holograms. Time division multiplexing and routing can be combined on the same tunable cell in accordance with my invention.

FIG. 11 shows a configuration of the router-mixer. The input 1101 is a beam which consist of superposition of several monochromatic beams, each of the monochromatic beams carrying a temporal signal. This beam is incident on grating 1102 which is an encoded form of the aforesaid tune spatially multiplexed grating. The grating is tuned via tuning source 1103 which consists of two components, the DC component, and the fluctuating component. The DC component To is the tuning component, which is responsible for routing a selected monochromatic component to its associated output port 1104. T (t) is the fluctuating component which is responsible for producing the aforesaid heterodyne functionalities, including time division demultiplexing as well the AND logic gate function.

The configuration can be extended also to include spread spectrum techniques as well as combination of AND gate with spread spectrum. For the linear Electro-optic effect it possible to prove that for equally k spaced gratings on one plane, the multiplexed grating have very similar form to the one have been developed in equation 1 This can make the grating to serve as both spatial and wavelength demultiplexer. Also it is possible to cascade two tunable cells one for wavelength demultiplexing and the other for the spatial demultiplixing.

Since variations of the above embodiments of the invention will become apparent to skilled workers in the art, the scope of the invention is to be limited only by the terms of the flowing claims and art recognized equivalents thereto. For example, in the above designs, it was assumed that $T_0$ and T (t) must be produced by the same tuning source, but in general To and T (t) have totally different tuning origins. For example, To can be rotational tuning and T (t) can be electrical. The devices, which I described so far, can be designed in bulk structure, or can be as a part of integrated opto-electronic devices. Further these wide range tuning grating devices can be integrated within a laser to provide distributed laser over many wavelengths.

Etalon, MEMS, or Mach-Zender interferometers, microfabricated interferometers, fibre based interferometers are dependent on the optical path length as well the input wavelength, and this fact means that interferometers can be used in wavelength division demultiplexing. Likewise, gratings in volume material can also be employed which are also sensitive to the variation in the incident beam direction as well as wavelength. Either change in the input wavelength or in the beam direction can be considered as a variation in the K-vector of the wavelength and beam orientation input signals. Thus the claimed "K-wave selector," or "K-vector division demultiplexer" can demultiplex or detect various input signals of different wavelengths and/or angles of incidence. The term "detection" is not just hetrodyning but can include application of time slotted pulses as in FIG. 9. The term "K-vector selector" is intended to include arrays of discreet elements for certain applications such as multi-head microscopy, and non-discreet elements for other applications such as the wavefront detection apparatus of FIG. 8b. The term "transmitted", in connection with K-vector selector transmission of light is intended to include the equivalent reflection mode. Whenever heterodyne detection is applied, it also be replaced by time integrative correlation. "Heterodyne detection" can have a broad meaning, and could include at least some, if not all of these functionality's: phase sensitive detection, lock in detection, base band demodulation, frequency division demultiplexing, frequency conversion. Spectroscopic correlation is a wide range time integrative correlation. Heterodyne detection is intended to include homodyne detection. The term "modulation" can take various forms including, time, space-time, phase, frequency and K vector modulation. The spectroscopic correlation, which was described in my U.S. utility patent application Ser. No. 09/332,404, filed Jun. 14, 1999, entitled "Spectroscopic Time Integrative Correlation for Rapid Medical Diagnostic and Universal Image Analysis" may be considered as a form of time integrative correlation with a severe Doppler shift. The Doppler shift is large, up to the extent of changing the colors. Time division demultiplixing (TDM) is a form of broad band time integrative correlation with asynchronous binary slot pulses, which represent the time slots. The AND gate can be considered as a broad band asynchronous bits correlation between the input and template bits. The "optical image under examination" is intended to include virtually any type of image including a microscopic, tomographic or remote target image.

In the special case of very fast modulation, the k-vector selector can act as a low pass filter so that the CCD detector can be eliminated. Thus the k-vector low pass filter can act as the claimed "time integrating detector means." The "tuning means" are is not limited to be electrical; it can be replaced by other tuning sources depending on the materials used for fabrication of the devices. Some of the tuning means can include electrical, optical, acoustical, piezoelectric, elasto-optic, magneto-optics, magnetic, stress, mechanical, cell electro-optic effect. The term "fluctuating temporal signal" and "DC tuning signal" are not to be restricted to electrical signals, but could comprise stress, thermal changes, or the like mentioned above.

I claim:

1. A high resolution pickup device for reading data off of and writing upon an optical recording medium comprising:
   (a) a k-vector selector tunable cell for processing k-vector modulated temporal light signals read off of said optical recording medium;
   (b) focusing means for directing said k-vector modulated temporal light signals processed by said k-vector selector on light beam detector means; and
   (c) tuning control means for applying a fluctuating temporal heterodyne tuning signal to said k-vector selector tunable cell that is phase locked with respect to a fundamental repetition frequency of said temporal light signals read off of said optical recording medium, for enhancing the tracking accuracy of said high resolution pickup device.

2. The pickup device of claim 1 wherein said focusing means is coupled to an electrical control circuit for changing the focal length of said focusing means in response to the application of varying direct current control signals applied thereto.

3. The pickup device of claim 2 wherein said focusing means is positioned within said k-vector selector tunable cell.

4. The pickup device of claim 1 wherein said focusing means comprises a high nanoscale resolution holographic lens.

5. The pickup device of claim 2 wherein said focusing means comprises a high nanoscale resolution holographic lens.

6. The pickup device of claim 3 wherein said focusing means comprises a high nanoscale resolution holographic lens.

7. The pickup device of claim 4 wherein said high nanoscale resolution holographic lens comprises an interference pattern between light emitted from a tiny nanoscale point source of light and a plane or quasi-plane wave broad light beam.

8. The pickup device of claim 5 wherein said high nanoscale resolution holographic lens comprises an interference pattern between light emitted from a tip of an optical fiber, said tip producing a nanoscale point source of light, and a plane or quasi-plane wave broad light beam.

9. The pickup device of claim 6 wherein said high nanoscale resolution holographic lens comprises an interference pattern between light emitted from a tip of an optical fiber, said tip producing a nanoscale point source of light, and a plane or quasi-plane wave broad light beam.

10. The pickup device of claim 1 wherein said tuning control means also selectively applies a plurality of DC wavelength establishing electrical control signals to said K-vector selector tunable cell for selectively altering the focal length of said electrically controllable lens means for in turn enabling reading data off of a plurality of variously positioned optical recording elements.

11. The pickup device of claim 3 wherein said tuning control means also selectively applies a plurality of DC wavelength establishing electrical control signals to said K-vector selector tunable cell for selectively altering the focal length of said focusing means for in turn enabling reading data off of a plurality of variously positioned optical recording elements.

12. The pickup device of claim 7 wherein said tuning control means also selectively applies a plurality of DC wavelength establishing electrical control signals to said K-vector selector tunable cell for selectively altering the focal length of said electrically controllable lens means for in turn enabling reading data off of a plurality of variously positioned optical recording elements.

13. A highs resolution pickup device for reading data off of and writing data upon an optical recording medium comprising:

(a) a k-vector selector cell for processing k-vector modulated temporal light signals read off of said optical recording medium;

(b) electrically controllable lens means associated with said k-vector selector cell for directing said k-vector modulated temporal light signals processed by said k-vector selector cell on light beam detector means; and (c) control means for selectively applying a plurality of DC wavelength establishing electrical control signals to said K-vector selectable cell for selectively altering the focal length of said electrically controllable lens means for in turn enabling reading data off of a plurality of variously positioned optical recording elements.

* * * * *